(12) United States Patent
Sabesan et al.

(10) Patent No.: US 9,384,376 B2
(45) Date of Patent: Jul. 5, 2016

(54) RFID TAG INTERROGATION SYSTEMS

(75) Inventors: Sithamparanathan Sabesan, Middlesex (GB); Michael Crisp, Cambridge (GB); Richard Penty, Royston (GB); Ian H. White, Cambridge (GB)

(73) Assignee: Cambridge Enterprise Limited (GB)

( * ) Notice: Subject to any disclaimer, the term of this patent is extended or adjusted under 35 U.S.C. 154(b) by 763 days.

(21) Appl. No.: 13/643,275

(22) PCT Filed: Apr. 18, 2011

(86) PCT No.: PCT/GB2011/050763
§ 371 (c)(1),
(2), (4) Date: May 22, 2013

(87) PCT Pub. No.: WO2011/135329
PCT Pub. Date: Nov. 3, 2011

(65) Prior Publication Data
US 2013/0234831 A1    Sep. 12, 2013

(30) Foreign Application Priority Data

Apr. 26, 2010  (GB) .................................. 1006907.8
Dec. 17, 2010  (GB) .................................. 1021454.2

(51) Int. Cl.
*G06K 7/10*       (2006.01)
*G06K 7/00*       (2006.01)
(Continued)

(52) U.S. Cl.
CPC .......... *G06K 7/10019* (2013.01); *G06K 7/0008* (2013.01); *G06K 7/10346* (2013.01);
(Continued)

(58) Field of Classification Search
CPC ............ G06K 7/0008; G06K 7/10019; G06K 7/10346
See application file for complete search history.

(56) References Cited

U.S. PATENT DOCUMENTS 5,387,900 A  *  2/1995  Plonsky ............. G08B 13/2408
                                                     340/551
8,072,311 B2 †  12/2011  Sadr
(Continued)

FOREIGN PATENT DOCUMENTS

EP      1 772 814 A2    4/2007
GB      2 383 708 A     7/2003
(Continued)

OTHER PUBLICATIONS

GB Search Report for corresponding GB1006907.8, Date of Search: Jul. 28, 2010.
(Continued)

*Primary Examiner* — Benjamin C. Lee
*Assistant Examiner* — Rajsheed Black-Childress
(74) *Attorney, Agent, or Firm* — Tarolli, Sundheim, Covell & Tummino LLP

(57) ABSTRACT

We describe an RFID tag reading system comprising a plurality of transmit/receive antennas to provide spatial transmit/receive signal diversity, and a tag signal decoder. The system combines received RF signals from the antennas, and the antennas are spaced apart from one another sufficiently for one said antenna not to be within the near field of another. The system performs a tag inventory cycle comprising a plurality of tag read rounds, each having a set of time slots during which a said tag is able to transmit tag data including a tag ID. The system is configured to perform, during a tag inventory cycle, one or both of: a change in a frequency of the tag interrogation signals transmitted simultaneously from the plurality of antennas, and a change in a relative phase of a the RF tag interrogation signal transmitted from one of the antennas with respect to another.

19 Claims, 20 Drawing Sheets

(51) Int. Cl.
　　　H01Q 25/00　　　(2006.01)
　　　G06Q 10/08　　　(2012.01)
　　　H01Q 1/22　　　　(2006.01)
　　　G01S 13/76　　　 (2006.01)
　　　H01Q 3/26　　　　(2006.01)

(52) U.S. Cl.
　　　CPC .......... *G01S13/767* (2013.01); *G06K 7/10316* (2013.01); *G06Q 10/087* (2013.01); *H01Q 1/2216* (2013.01); *H01Q 3/2611* (2013.01); *H01Q 25/00* (2013.01)

(56) References Cited

U.S. PATENT DOCUMENTS

| | | | |
|---|---|---|---|
| 8,395,482 B2 † | 3/2013 | Sadr | |
| 8,768,248 B2 † | 7/2014 | Sadr | |
| 2002/0063622 A1* | 5/2002 | Armstrong | G06K 7/0008 340/10.31 |
| 2004/0048575 A1* | 3/2004 | Goldberg | H04B 1/1081 455/65 |
| 2004/0235512 A1 | 11/2004 | Kiiski et al. | |
| 2004/0266360 A1 | 12/2004 | Hamalainen et al. | |
| 2005/0141594 A1* | 6/2005 | Smith | H04B 1/692 375/130 |
| 2005/0176368 A1* | 8/2005 | Young | H04B 7/15578 455/11.1 |
| 2005/0246247 A1* | 11/2005 | Lyon | G06K 7/10336 705/28 |
| 2006/0044204 A1* | 3/2006 | Kruth | H01Q 25/00 343/824 |
| 2007/0126585 A1* | 6/2007 | Okunev | G06K 7/0008 340/572.7 |
| 2007/0139200 A1* | 6/2007 | Yushkov | H04B 1/0003 340/572.1 |
| 2007/0285239 A1* | 12/2007 | Easton | G06K 7/0008 340/572.1 |
| 2008/0024273 A1 | 1/2008 | Kruest et al. | |
| 2008/0076476 A1 | 3/2008 | Rofougaran | |
| 2009/0079573 A1* | 3/2009 | Jiang | G06K 7/0008 340/572.7 |
| 2010/0085190 A1* | 4/2010 | Sueoka | H04Q 9/00 340/572.7 |
| 2011/0032079 A1* | 2/2011 | Bloy | H01P 5/02 340/10.1 |
| 2011/0133891 A1* | 6/2011 | Krug | G06K 7/0008 340/10.1 |
| 2015/0327085 A1* | 11/2015 | Hadani | H04L 5/0023 370/252 |

FOREIGN PATENT DOCUMENTS

| | | |
|---|---|---|
| KR | 20070056815 | 6/2007 |
| KR | 20080074451 | 8/2008 |
| KR | 20100008282 | 1/2010 |

OTHER PUBLICATIONS

Doubkin: (extract) "*The RF in RFID—Passive UHF RFID in Practice*" p. 176-177.

Sabesan et al.: "*Demonstration of Improved Passive UHF RFID Coverage Using Optically-Fed Distributed Multi-Antenna System*"; 2009 IEEE International Conference on RFID; p. 217-224.

Viikari, et al.: "*Ranging of UHF RFID Tag Using Stepped Frequency Read-Out*"; IEEE Sensors Journal, vol. 10, No. 9, Sep. 2010, p. 1535-1539.

Nikitin, et al.: "*Phase Based Spatial Identification of UHF RFID Tags*"; IEEE RFID 2010, p. 102-109.

Chattopadhyay, et al.: "*Analysis of UHF Passive RFID Tag Behavior and Study of Their Applications in Low Range Indoor Location Tracking*"; IEEE 2007, p. 1217-1220.

Guo, et al.: "*Research of Indoor Location Method Based on the RFID Technology*"; Proceedings of the 11th Joint Conference on Information Sciences, 2008, p. 1-6.

Zhao, et al.: "*Research on the Received Signal Strength Indication Location Algorithm for RFID System*"; IEEE 2006 ISCIT 2006, p. 881-885.

Xu et al.: "*Random Sampling Algorithm in RFID Indoor Location System*"; Proceedings of the Third IEEE International Workshop on Electronic Design, Test and Applications (DELTA '06), IEEE Computer Society, 6 pages.

Hatami and Pahlavan: "*Comparative Statistical Analysis of Indoor Positioning Using Empirical Data and Indoor Radio Channel Models*"; IEEE CCNC 2006 Proceedings; p. 1018-1022.

Hatami, et al.: "*A Comparative Performance Evaluation of RSS-Based Positioning Algorithms Used in WLAN Networks*"; IEEE 2005; 7 pages.

International Search Report for corres. PCT/GB2011/050763 completed Jul. 29, 2011.

Dobkin: "*The RF in RFID*", Communications Engineering Series, pp. v-ix, 103, 176-179.

Sabesan, et al.: "*Demonstration of Improved Passive UHF RFID Coverage Using Optically-Fed Distributed Multi-Antenna System*"; 2009 IEEE International Conference on RFID, pp. 217-224.

\* cited by examiner
† cited by third party

RFID TAG INTERROGATION SYSTEMS

RELATED APPLICATIONS

The present invention claims priority from PCT Application No. PCT/GB2011/050763, filed 18 Apr. 2011; which claims priority from GB 1021454.2, filed 17 Dec. 2010 and GB1006907.8 filed 26 Apr. 2010, which are incorporated herein in their entirety.

FIELD OF THE INVENTION

This invention relates to systems, methods and computer program code for reading RFID (Radio Frequency Identification) tags, in particular UHF (Ultra High Frequency) RFID tags.

BACKGROUND TO THE INVENTION

RFID has become established in a wide range of applications for the detection and identification of items, allowing substantial amounts of data to be read at greater range than other technologies. Of particular interest is the high frequency (UHF) passive RFID system which promises to offer read ranges of the order of ten meters using tags which do not require their own power source. However these devices typically only have a high probability of being successfully read at distances of a few meters from the reader antennas. This performance typically significantly restricts their applications to environments where local antennas are used for interrogation purposes.

In order for a passive UHF RFID tag to be successfully read, it should receive sufficient radio frequency (RF) power for its internal logic to be activated and transmit back to the reader with sufficient signal-to-noise ratio (SNR). This requirement sets limits on the maximum tag range. However, due to the narrowband nature of the signals, fading effects in real environments generate large variations in the free space loss of both up- and downlink directions and can prevent successful reading of the tag, even well within the maximum read range. Therefore in order to fully deploy these passive UHF RFID tags in real applications, robust reading techniques are required for long range conditions.

Several studies have been undertaken to enhance passive UHF RFID system performance. However, standard RFID systems currently cannot prevent errors (i.e. 100% probability of a successful read). By way of example, "The RF in RFID-passive UHF RFID in practice" by Daniel M. Doubkin proposes a number of ways of improving SNR: The author suggests that inclusion of a 90° phase shift either in in-phase (I) or quadrature (Q) channel in the conventional direct-conversion I/O demodulator improves the SNR of the tag backscattered signal since the phase of the backscattered signal is unpredictable due to its dependent on the distance from the tag.

By way of further example, Mojix (http://www.mojix.com/) has a passive UHF RFID system with phased array of antennas (i.e. the antennas are in the near field region of one another). This allows phased array techniques to be employed, for example digital beam forming to maximise the link budget. This enables improved receiver sensitivity and transmitters which provide radio frequency (RF) signals in the industrial, scientific and medical (ISM) band (902 MHz and 928 MHz) for activating the tags. Details can be found, for example in: WO2007/094868, WO2008/118875 and WO2008/027650. Further background can be found in: EP2146304 and in US 2008/0024273.

The EPC global UHF Class 1 Generation 2 RFID protocol standard allows frequency hopping spread spectrum (FHSS) technique in the US and listen-before-talk technique in the UK to overcome interference in multiple- and dense-interrogator environments [EPCglobal Specification for RFID Air Interface, online available: http://www.epcglobalinc.org/standards/uhfc1g2/uhfc1g2_1_2_0-standard-20080511.pdf;] [EPCglobal Class Gen 2 RFID Specification, Alien, online available: http://www.rfidproductnews.com/whitepapers/files/AT_wd_EPC-Global_WEB.pdf].

There is a need for improved techniques for reading in particular UHF passive RFID tags, and for locating such tags, especially in situations where multiple tags may be present in a common region of space.

SUMMARY OF THE INVENTION

According to a first aspect of the invention there is therefore provided an RFID tag reading system for reading one or more RFID Tags, the system comprising an RF transmitter and an RF receiver, a plurality of transmit/receive antennas coupled to said RF transmitter and to said RF receiver, to provide spatial transmit/receive signal diversity, and a tag signal decoder coupled to at least said RF receiver, wherein said system is configured to combine received RF signals from said antennas to provide a combined received RF signal, wherein said RF receiver has said combined received RF signal as an input; wherein said antennas are spaced apart from one another sufficiently for one said antenna not to be within the near field of another said antenna, wherein said system is configured to perform a tag inventory cycle comprising a plurality of tag read rounds to read said tags, a said tag read round comprising transmission of an RF tag interrogation signal simultaneously from said plurality of antennas and receiving a signal from one or more of said tags, a said tag read round having a set of time slots during which a said tag is able to transmit tag data including a tag ID for reception by said antenna, and wherein said system is configured to perform, during a said tag inventory cycle, one or both of: a change in a frequency of said tag interrogation signal transmitted simultaneously from said plurality of antennas, and/or a change in a relative phase of a said RF tag interrogation signal transmitted from one of said antennas with respect to another of said antennas.

In embodiments by combining the RF signals from the antennas in a system which employs spatial diversity (that is the antennas are spaced so as not to comprise a phased array), and by dithering one or both of the transmit frequency and relative phase during an inventory cycle more tags can be read. Counter-intuitively the system also runs faster because there are fewer collisions (although one might expect more if more tags are visible). Evidence for this is provided later. In embodiments the frequency/phase is changed on a relatively rapid time scale, for example over a time period of less than one second, 100 ms or 10 ms. Combining the RF signals from multiple antennas results in a reduced number of collisions compared with switching antennas.

In some preferred implementations of the system an RFID tag is configured to operate in accordance with a protocol for reading multiple passive RFID tags in a common region of space, for example the EPC Gen 2 protocol (ibid). In such a protocol an estimate may be made of the total number of tags and rounded up to the next power of 2, thus defining the number of transmit slots for the tags to use. This number is transmitted to the tags and enables a tag to select a slot in which to transmit and, once read, to keep silent (eventually re-awakening). (The phrase "inventory round" is defined in EPC Gen 2; this definition is explicitly incorporated by reference). During the tag read round we refer to above tags are read during the available time slots and, in embodiments, the frequency and/or relative phase is then changed before performing another tag read round. This is because a proportion, for example around half, of the tags are read in a read round; in some preferred embodiments the number of available slots for the tags is updated to the next power of 2 above the remaining total of number of tags to be read (noting that this may be an estimate as the total number of tags may be unknown). In embodiments this procedure is repeated, for example until no more tags can be read, or for a given or predetermined duration, or indefinitely (since tags eventually re-awake).

Some preferred implementations of the procedure change the relative phase of the transmitted signals during the tag inventory cycle. In such an approach the transmitted signal phase at one antenna may be defined as a reference against which to determine the phases at the other antennas.

In embodiments the system may also be configured to adjust a transmit power or receive antenna gain prior to combining the RF signals, to optimise the combined received RF signal, for example to maximise signal-to-noise ratio or minimise a bit or packet error ratio.

In some preferred embodiments the system has at least three spatially diverse antennas which, unlike a switched antenna system, gives improved performance. In embodiments the RFID tags are passive UHF (300 MHz-3000 MHz) RFID tags, preferably operating at a frequency of less than 1 GHz, and preferably the antennas are mutually separated by at least 1 meter, 2 meters, 5 meters, 10 meters or 20 meters.

In embodiments of the above described system provide greatly improved read/write performance, usable at increased ranges, with improved tag reading SNR (signal-to-noise ratio)—in particular in embodiments it has been found possible to read substantially 100% of tags present in a region bounded by lines joining the antennas, and to substantially eliminate the effects of nulls.

In a related aspect there is provided a method of using an RFID tag reading system for reading one or more RFID tags, the system comprising an RF transmitter and an RF receiver, a plurality of transmit/receive antennas coupled to said RF transmitter and to said RF receiver, to provide spatial transmit/receive signal diversity, and a tag signal decoder coupled to at least said RF receiver, wherein said system is configured to combine received RF signals from said antennas to provide a combined received RF signal, wherein said RF receiver has said combined received RF signal as an input; wherein said antennas are spaced apart from one another sufficiently for one said antenna not to be within the near field of another said antenna, wherein said system is configured to perform a tag inventory cycle comprising a plurality of tag read rounds to read said tags, a said tag read round comprising transmission of an RF tag interrogation signal simultaneously from said plurality of antennas and receiving a signal from one or more of said tags, a said tag read round having a set of time slots during which a said tag is able to transmit tag data including a tag ID for reception by said antenna, the method comprising changing, during a said tag inventory cycle, one or both of: a relative phase of a said RF tag interrogation signal transmitted from one of said antennas with respect to another of said antennas, and a frequency of said tag interrogation signal transmitted simultaneously from said plurality of antennas.

The invention further provides processor control code to implement the above-described systems and methods, for example on a general purpose computer system or on a digital signal processor (DSP). The code may be provided on a carrier such as a disk, CD- or DVD-ROM, programmed memory such as read-only memory (Firmware). Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

The antennas may be fed either by co-ax, radio over fiber techniques or via any other appropriate transmission media. Where long distance transmission is necessary (i.e. over 100 m), the RF signals to and/or from the antennas or antenna units are likely carried by RF-over-fibre apparatus/methods. Likewise in short transmission co-ax cables, or twisted pair (i.e. CAT-5/6) may be preferred.

In embodiments one or more of said transmit/receive antennas may comprise a leaky feeder. Thus there is also provided a system/method for using an RFID tag reading leaky feeder system for reading one or more RFID tags. In embodiments the leaky feeder system comprises an RF leaky feeder transmitter and an RF leaky feeder receiver, a plurality of transmit/receive leaky feeders coupled to said RF leaky feeder transmitter and to said RF leaky feeder receiver, to provide spatial transmit/receive signal diversity, and a tag signal decoder coupled to at least said RF leaker feeder receiver. The system is configured to combine received RF signals from said leaky feeders to provide a combined received RF signal. The RF leaky feeder receiver has the combined received RF signal as an input and the leaky feeders are spaced apart from one another sufficiently for one said leaky feeder not to be within the near field of another said leaky feeder. In embodiments the system is configured to perform a tag inventory cycle comprising a plurality of tag read rounds to read the tags, a tag read round comprising transmission of an RF tag interrogation signal simultaneously from the plurality of leaky feeders and receiving a signal from one or more of the tags. A tag read round has a set of time slots during which a tag is able to transmit tag data including a tag ID for reception by a leaky feeder. The system/method comprises (means for) changing, during a tag inventory cycle, one or both of: a relative phase of a RF tag interrogation signal transmitted from one of the leaky feeders with respect to another of the leaky feeders, and a frequency of the tag interrogation signal transmitted simultaneously from the plurality of leaky feeders.

BRIEF DESCRIPTION OF THE DRAWINGS

These and other aspects of the invention will now further described, by way of example only, with reference to the accompanying Figures as follows.

DETAILED DESCRIPTION OF PREFERRED EMBODIMENTS

Multiple fiber-fed antennas can improve the coverage of an RFID system [S. Sabesan, M. Crisp, R. Penty, I. White, "Demonstration of Improved Passive UHF RFID Coverage using Optically-Fed Distributed Multi-Antenna System," *IEEE International Conference on RFID*, April 2009]. We now show how enhanced coverage can be achieved by manipulating the phase differences and carrier frequency of the read/write signals to the RFID tag from the multiple antennas which are placed outside each other's near field.

Figure 1:
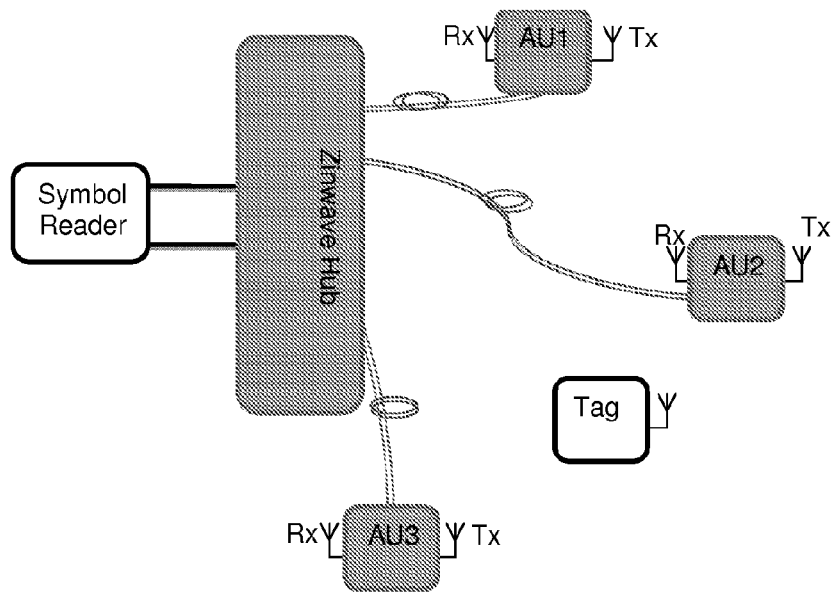
FIG. 1. Triple antenna distributed antenna system (DAS) combined with Symbol reader.
Figure 2:
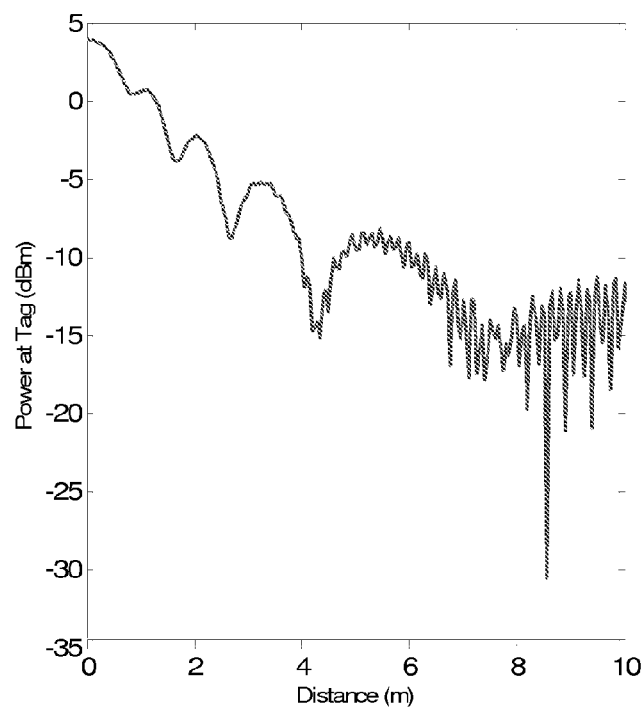
FIG. 2. Plot of power at tag as a function of distance away from an antenna for a triple antenna DAS.

Thus we describe read/writer system which operates over a distributed antenna system (DAS). Although coax-based systems, or those using other transmission media could be used, our work has focussed primarily in using radio over fibre (RoF) systems to transmit and receive signals from antenna units (AUs) to RFID tags. The use of several antennas reduces system errors due to nulls compared to passive RFID system using single omni- and directional antennas because of spatial diversity as shown in FIG. 1. However, multi-path effects (due to reflections from floors, ceilings, and walls, etc) and destructive interference occurring between signals from different antennas in the DAS results in deep fading as shown in FIG. 2 for a modelled simple environment. We make use of the fact that the RFID tags operate over a range of carrier frequencies which, although small, is sufficient so that frequency dithering can allow the movement of nulls from specific positions, and along with control of the amplitude transmitted at each antenna, the depth of remaining nulls can be reduced. By using this combined approach substantially error-free reading and writing as well as enhanced returned signal strength (RSSI) can be achieved for greater distances than by conventional means.

Figure 3:
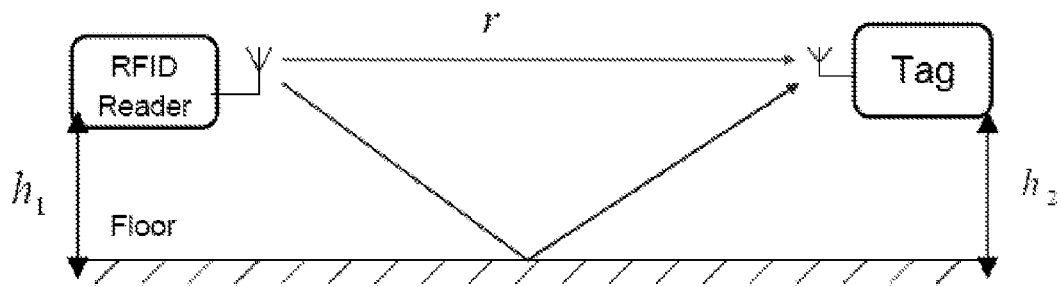
FIG. 3. Two ray model; red line represents the direct path and blue line represents the reflected path from the floor.
Figure 4:
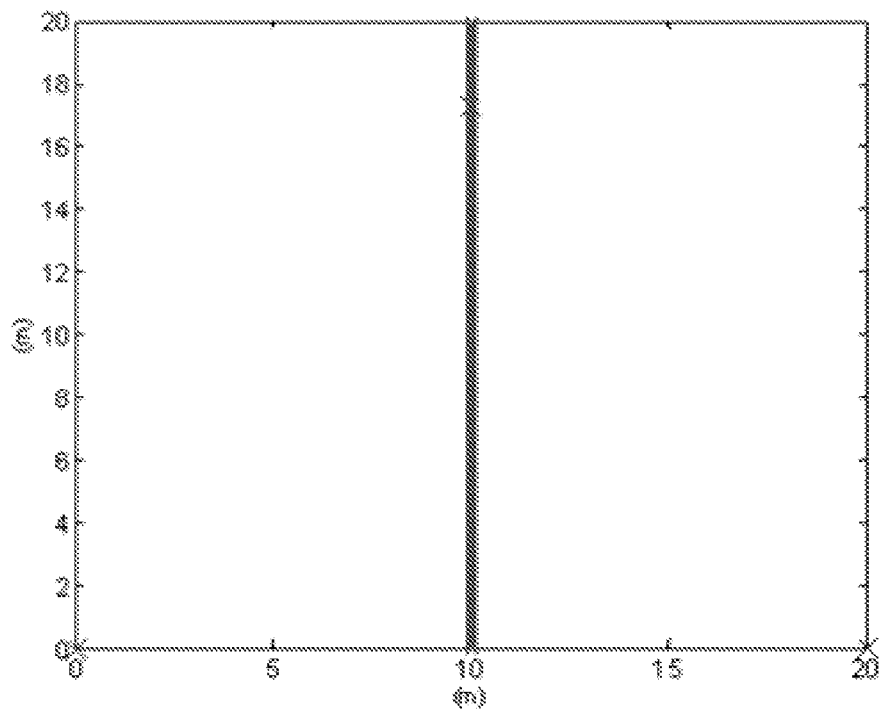
FIG. 4. Antenna arrangement in a 20 m×20 m area. Blue crosses represent the position of the antennas and red crosses indicate the grid points where the power is calculated.
Figure 5:
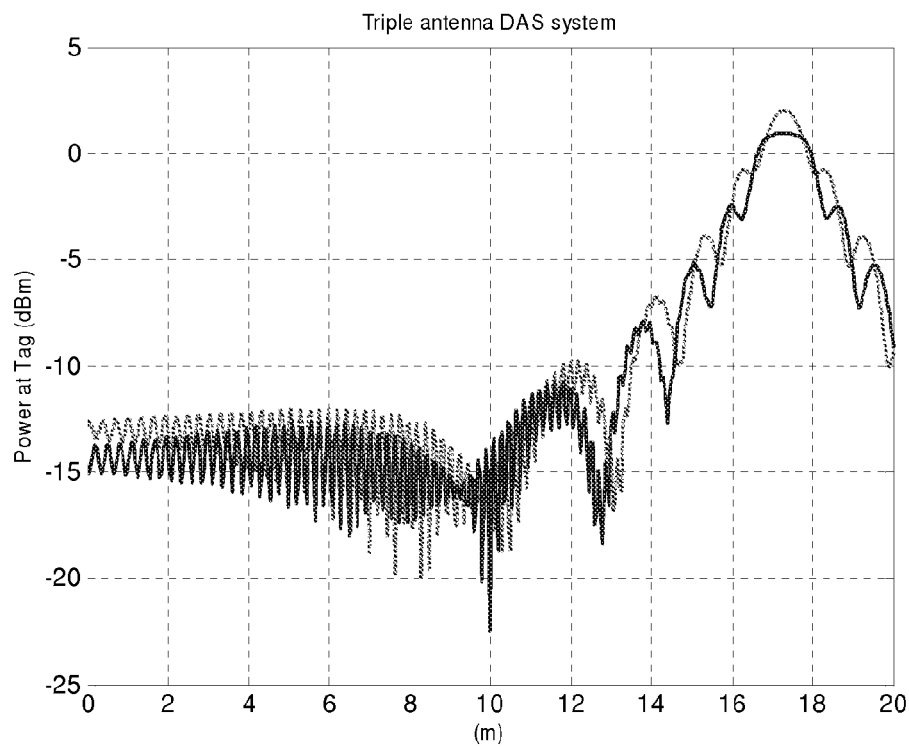
FIG. 5. Plot of power at tag as a function of distance for a triple antenna DAS. This shows how nulls move with frequency. Red and blue represent 860 MHz and 920 MHz respectively.
Figure 6:
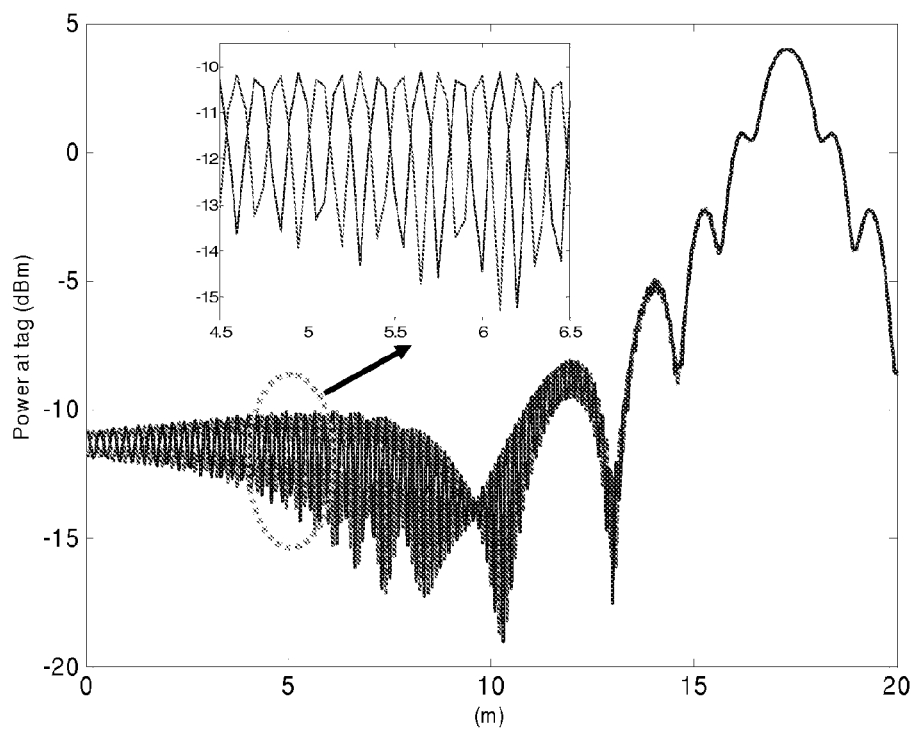
FIG. 6. Plot of power at tag as a function of distance for a triple antenna DAS. This shows how nulls move with phase. Red and blue represent 0, 0, 0 and 8, 0, π phase angle of each antenna respectively.

By way of example, three antennas are placed in 20 m apart and a simple 2-ray model (FIG. 3) is used to calculate the power along the red crosses as shown in FIG. 4. It is clearly shown that the nulls move with the frequency and phase dithering as shown in FIGS. 5 and 6 respectively. Therefore, if a tag interrogation procedure is carried out in several frequency and phase configurations, a tag at any given location will not experience a null in one of the combinations Since the tag is generally at an unknown location in an unknown environment, the "correct" combination of amplitudes and frequencies which result in constructive interference at the tag may be found by an exhaustive search.

Figure 7:
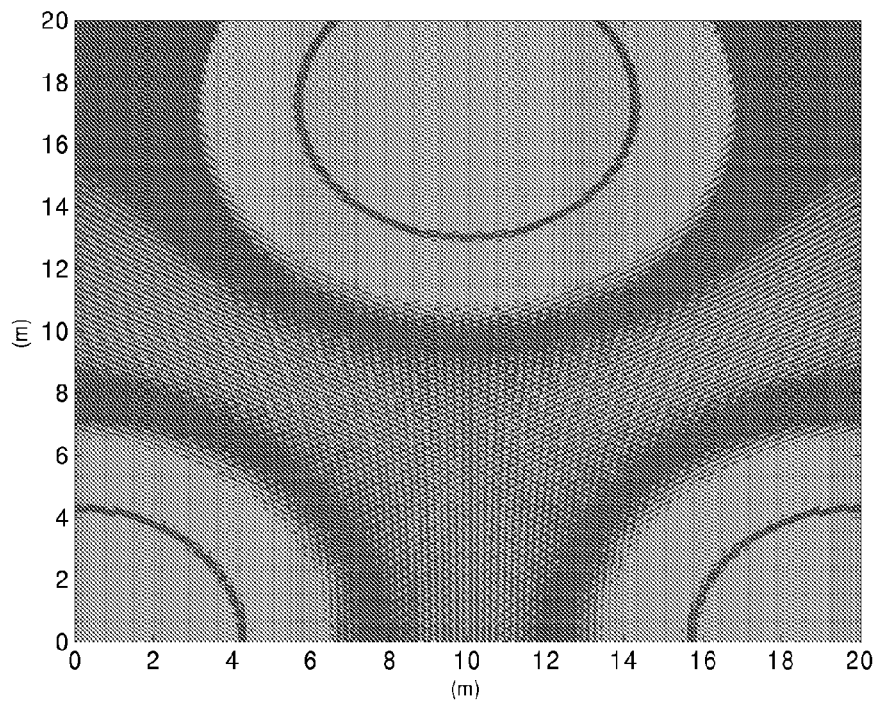
FIG. 7. A plot of spatial variation in the signal power using a 2-ray model. Green represents above −15 dBm power level and red represents below −15 dBm power level which represents nulls. The number of read locations is 55.7%.
Figure 8:
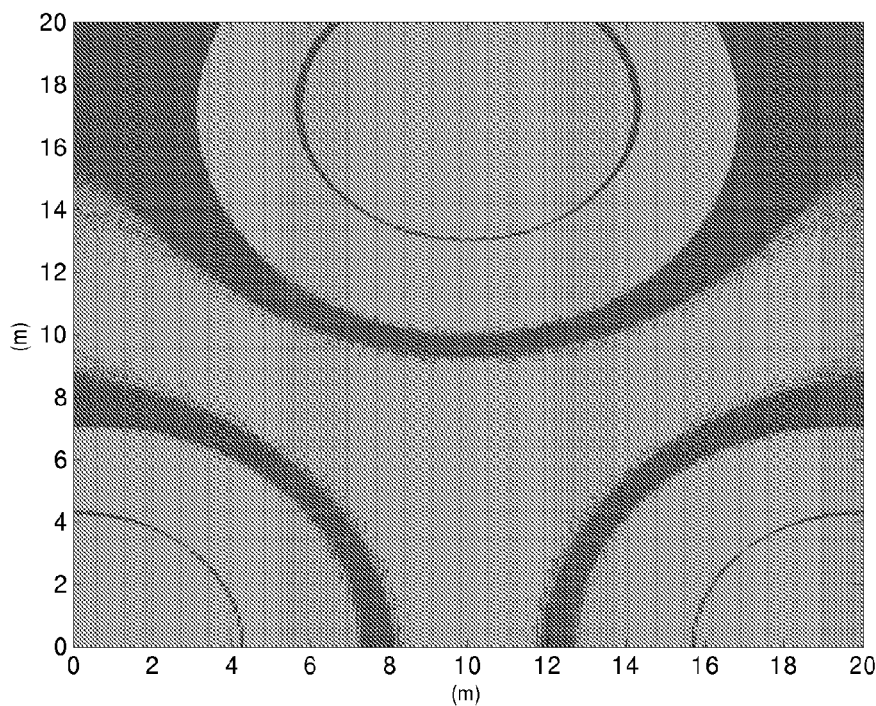
FIG. 8. A plot of spatial variation in the signal power with each antenna shifted by π (180°) in turn. Green represents above −15 dBm power level and red represents below −15 dBm power level which represents nulls. The number of read locations is now increased to 77% with the phase diversity.

FIG. 7 shows the received signal power from the three antennas each transmitting +33 dBm is shown on a 5 cm grid interval. It is then used to determine whether a successful read will be possible by considering a tag threshold power of −15 dBm and assuming that the tag threshold power will be the limiting factor. The number of read locations is shown to have increased from 55.7% to 77% with a phase dithering technique as shown in FIG. 8. The phase dithering technique here carries out the modelling with all the DAS antennas being phase matched and then each shifted by 180 degrees with respect to the others; the maximum returned power from the 4 cases is then plotted.

Frequency Dithering

We have demonstrated an improvement in received signal strength and reduction in the number of nulls with the use of multiple transmitting antennas and use of multiple receiving antennas. However, the number of nulls should be preferably further reduced to render the RFID more reliable. Here, a novel frequency dithering technique is applied to substantially eliminate the effect of the nulls.

Figure 9:
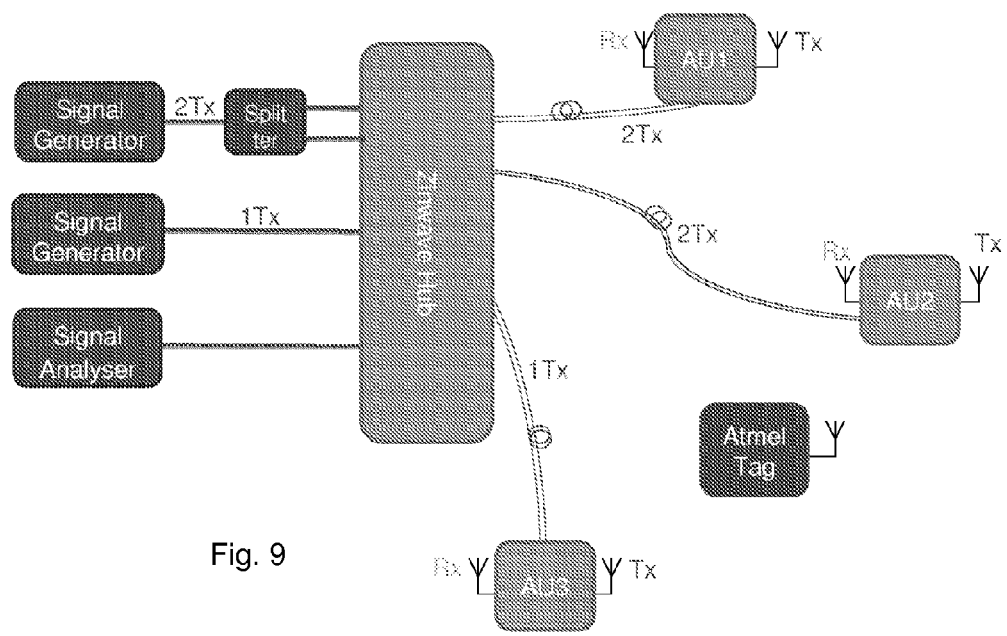
FIG. 9. Experimental Setup for frequency dithering.

The nulls can be moved and thus their averaged temporal effect can be reduced by altering the RFID carrier frequency. As shown in FIG. 9, two signal generators are used in this experiment for the purpose of transmitting two different frequencies simultaneously, one to transmit RFID carrier signals within the global tag frequency band (from 860 MHz to 960 MHz) which feeds to AU1 and AU2 and the other one to transmit the same frequency band signals which feeds to AU3. UK regulations allow a 2 MHz band between 865.5 MHz and 867.5 MHz for passive RFID split into 10, 200 kHz channels; the US regulations allow a 25 MHz band between 902 MHz and 928 MHz.

Figure 10:
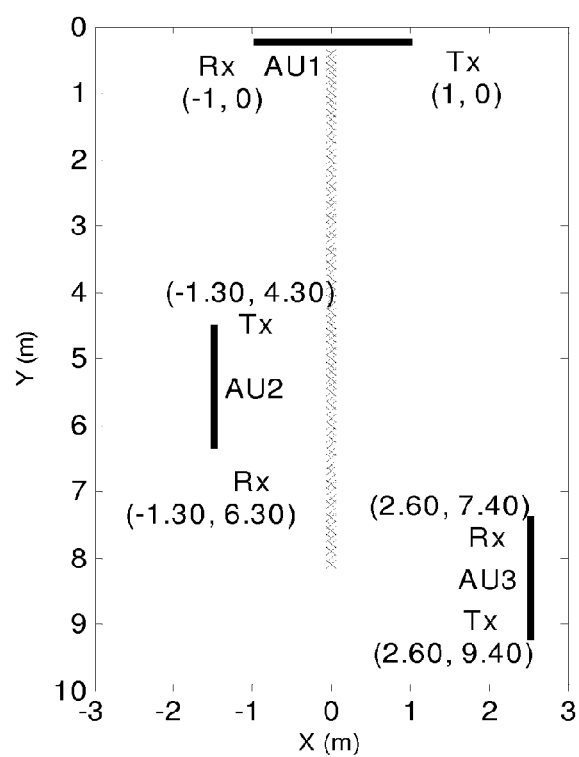
FIG. 10. Antenna arrangement. The positions of the antennas are indicated in meters in the form of (x, y) coordinates. Red crosses represent the measurement location.

FIG. 10 shows the antenna locations within a 10 m×4 m laboratory. The positions of the antennas are chosen to achieve overlapping areas of coverage within the constraints of a cluttered room. The backscattered signal power is measured at 10 cm intervals along a line away from AU1 in this and the following experiments.

Figure 11:
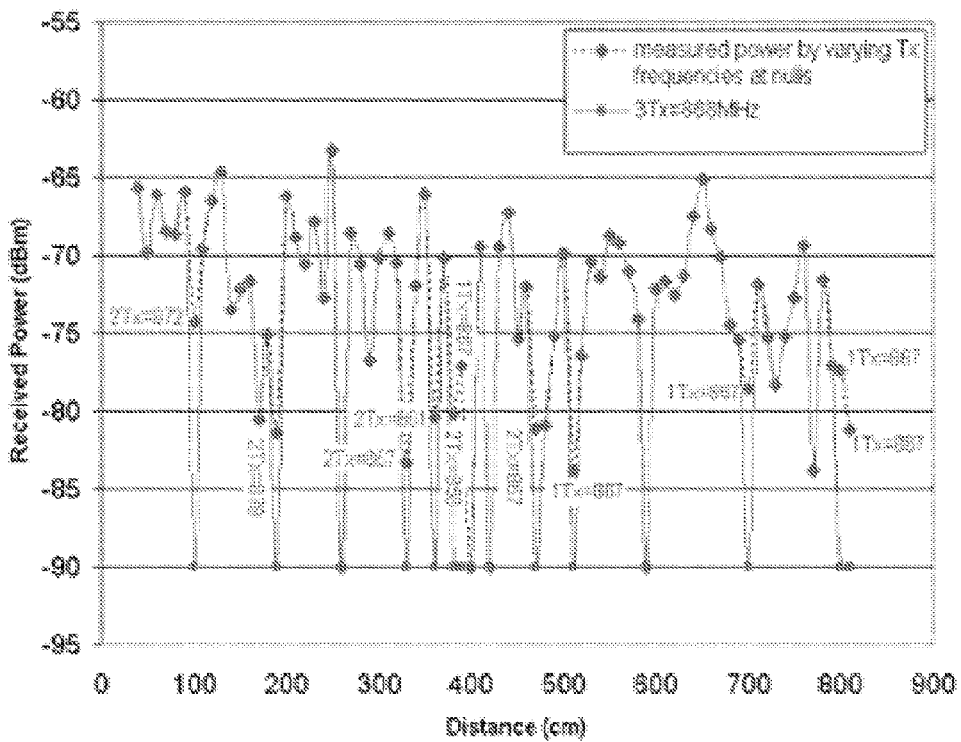
FIG. 11. Variation of returned signal strength with range for a triple antenna with adaptive frequency selection. The numbers in red represent the Tx frequencies in MHz at which nulls disappear.
Figure 12:
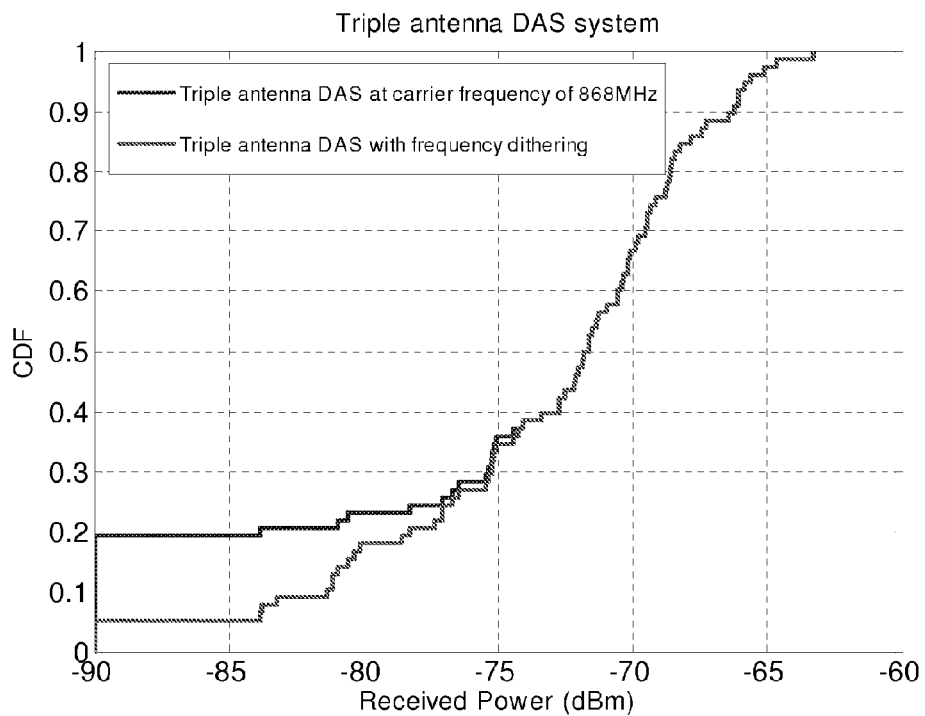
FIG. 12. Cumulative probability distribution of the experimentally measured returned signal power for a triple antenna with adaptive frequency selection and a tripe antenna DAS system.

When a null is encountered, the carrier frequency is varied with the aim of moving it to another location or of eliminating it. The variation of returned signal strength with range for a triple antenna with adaptive frequency selection is shown in FIG. 11. The numbers in red represent the Tx frequencies in MHz at which nulls disappear. The optimum frequency selection improves the number of read locations to 95%, as shown in FIG. 12. The reason for the enhancement is that at different frequency, the RFID signal has a different multi path effect and gain. Consequently, at an optimum frequency, the path losses are reduced; resulting in reducing the chance of a fade. Thus in a variation of frequency provides potential improvement in system performance. The skilled person will appreciate that the frequency dithering technique we describe improves passive RFID coverage and is different to the FHSS (Frequency hopping spread spectrum) technique of the EPC Class 1 Gen 2 RFID protocol previously mentioned.

Phase Dithering

Figure 13:
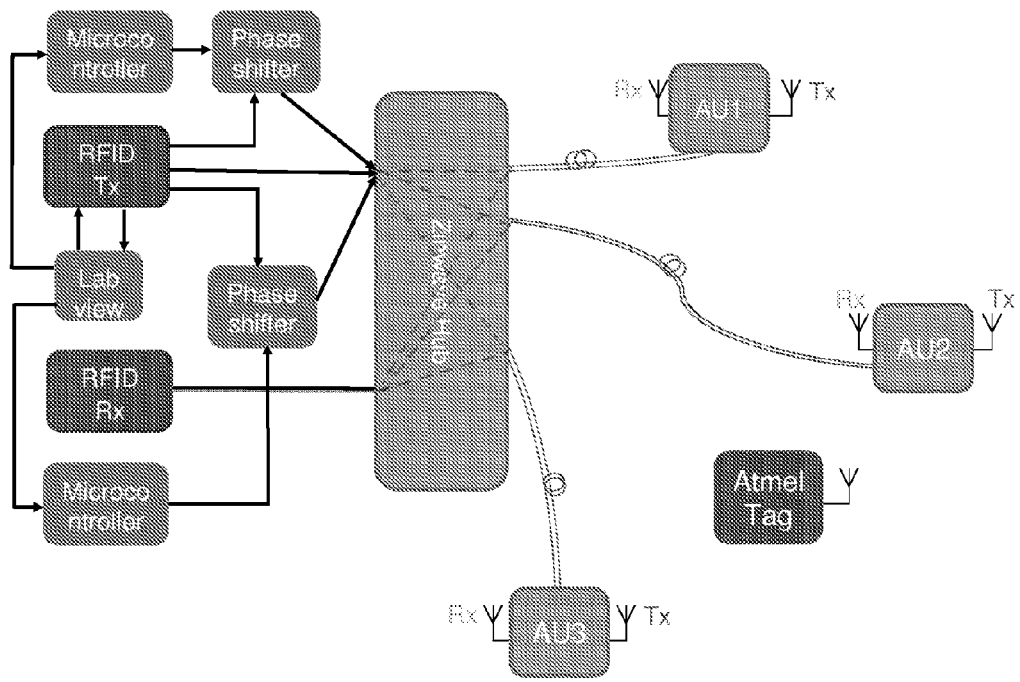
FIG. 13. Experimental setup for phase dithering.

Phase and power control are shown to provide improved performance in the multi-antenna system (FIG. 13). By applying phase shifts between the signals at each antenna while varying the phase in 24° steps between 0° and 360° with respect to a reference signal, it is possible to improve the passive RFID coverage. The coverage can be improved further by combing the received signals from each antenna and applying a different gain to the signal from each antenna to optimise the combined received signal SNR; for example, by altering the gain of uplink of each antenna unit (AU) in 10 dB steps or less between 0 dB and 30 dB.

Figure 14:
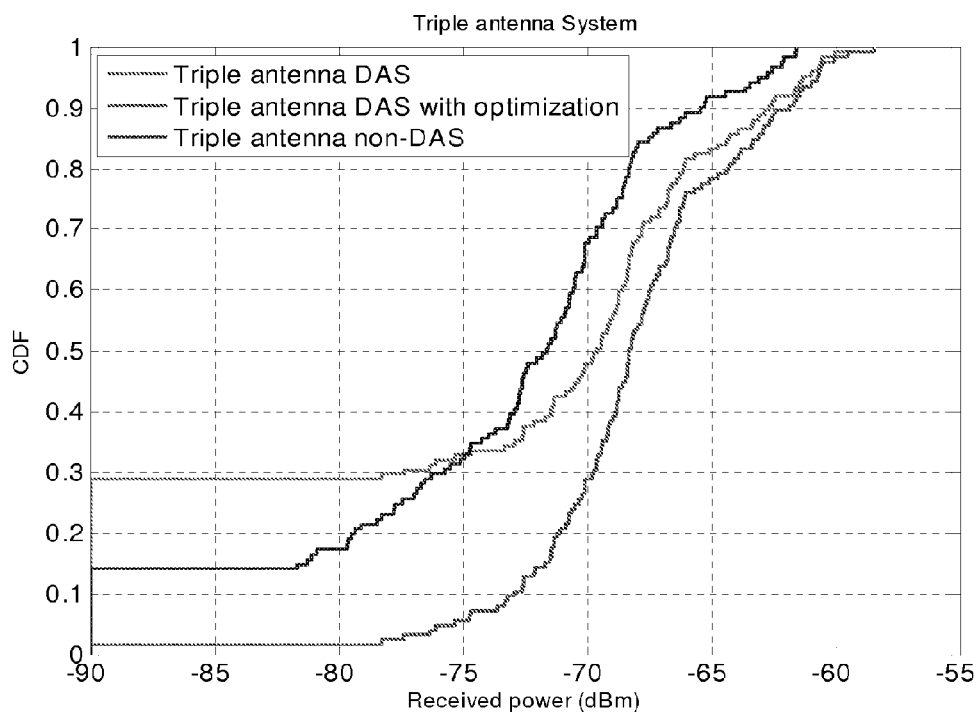
FIG. 14. Empirical cumulative probability distributions of the experimentally measured returned signal strength indicator (RSSI) for a triple antenna DAS, a triple antenna DAS with optimization (phase dithering) and a switched three antenna system.

As a result of these innovations, we have demonstrated a reduction in the number of nulls of a conventional DAS RFID system from 29% to 2% using 3 transmitting antennas and overlapping cells with phase control as shown in FIG. 14. The detected signal strength from the tag is also observed to increase by an average of approximately 10 dB compared with a conventional switched multi-antenna RFID system. However, when the triple antenna DAS system is compared with the more conventional multi-antenna RFID system which switches between antennas and selects the highest SNR, a performance reduction is seen. This is shown by the CDF plots in FIG. 14. It can be seen that the conventional switched triple antenna system has 14% nulls whereas a triple antenna DAS system has 29% nulls. The increase in the number of nulls in the DAS system can be accounted for by distractive interference occurring between signals from different antennas in the DAS resulting in fading. However, optimising the DAS using phase dithering technique can substantially eliminate the effect of fading when averaged over time and thus can provide a significant advantage over a conventional switched multi-antenna system, as shown in FIG. 14.

This improvement has been demonstrated using an R&S (Rohde & Schwarz) SMIQ signal generator and an R&S FSQ spectrum analyser as a RFID reader as shown in FIG. 13. The three antenna DAS system is formed by splitting the signals in the downlink and combining the signals from the antennas in the uplink. We then demonstrate the DAS optimisation by employing the phase dithering technique. The conventional switched three antenna system is tested by transmitting and receiving the signals from one antenna at a time and then obtaining the best received signal strength from all three antennas.

Figure 15:
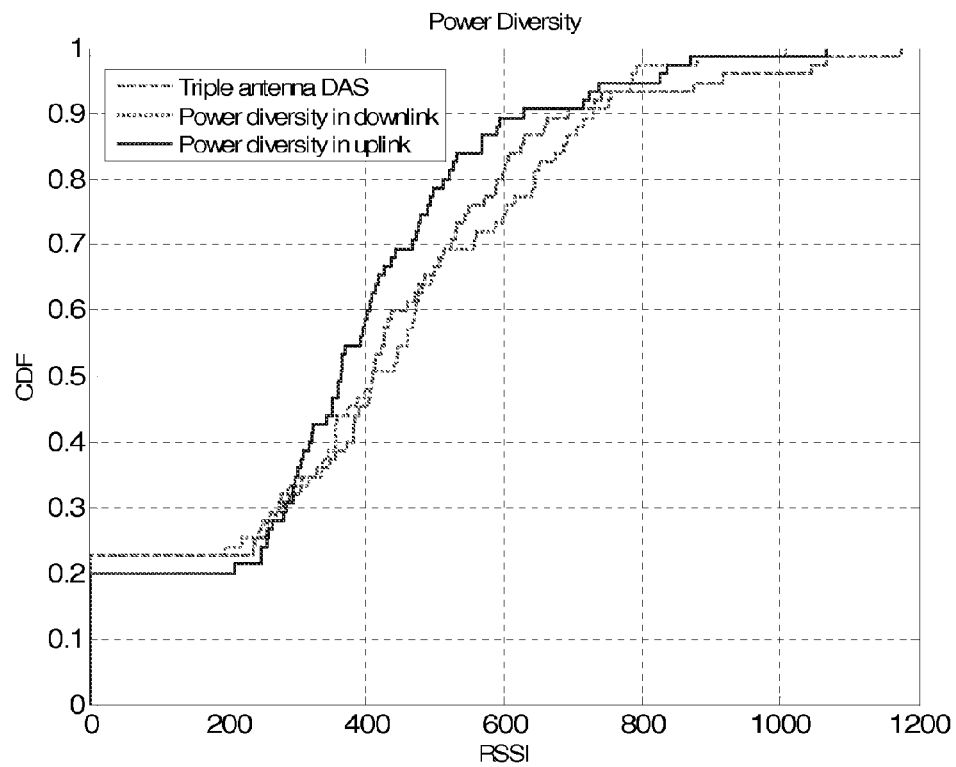
FIG. 15. Empirical cumulative probability distribution of the experimentally measured returned signal strength indicator (RSSI) for a triple antenna DAS, a triple antenna DAS with power diversity in downlink and in uplink.

FIG. 15 shows that the power control in uplink suppressing interference from other receiving antennas) enhances the received signal strength indication (RSSI) as the number of nulls is reduced from 24% to 20% in a triple antenna with power dithering over a triple antenna DAS system. The gain of the uplink and downlink is varied from 0 dB to 30 dB in 10 dB steps in the proposed optical UHF RFID system.

Proof of Principle (Antenna Diversity Combined with Frequency Dithering)

Figure 16:
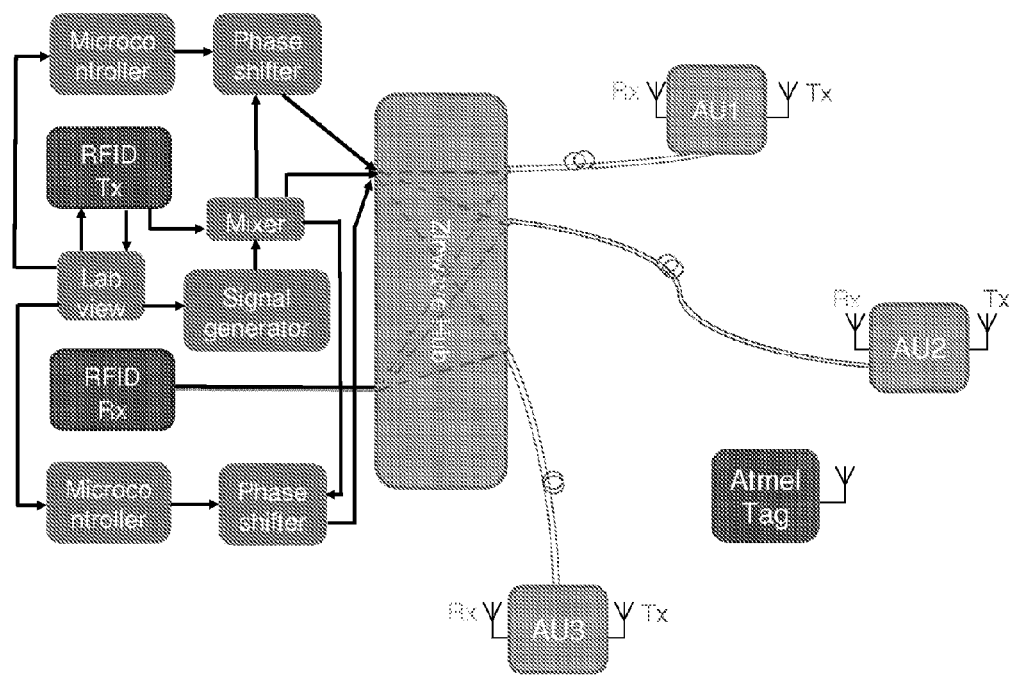
FIG. 16. Experimental setup for passive RFID coverage improvement.

A proof of principle demonstration for the improved passive RFID coverage has been carried out with a single tag in the field; the system is shown in FIG. 16. A signal generator and an analyser have been chosen to illustrate the improvement. A Labview program is designed to automatically vary the phase difference between two of the antennas in 24° steps between 0° to 360° while the frequency is varied from 860 MHz to 960 MHz in 1 MHz steps.

Figure 17:
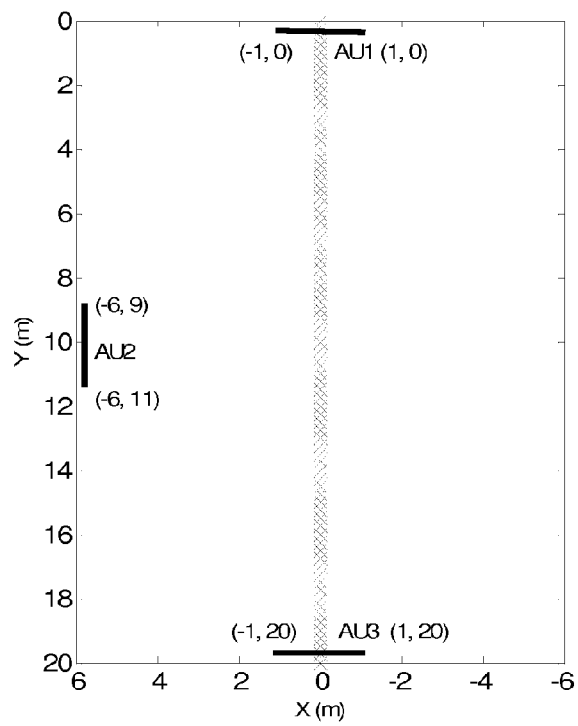
FIG. 17. Antenna arrangement. The positions of the antennas are indicated in meters in the form of (x, y) coordinates. Red crosses represent the measurement location FIG. 18. Cumulative probability distribution of the experimentally measured returned signal power for both triple antenna DAS and triple antenna DAS with optimization FIG. 19. Double antenna DAS combined with Alien 8800 RFID reader.
Figure 18:
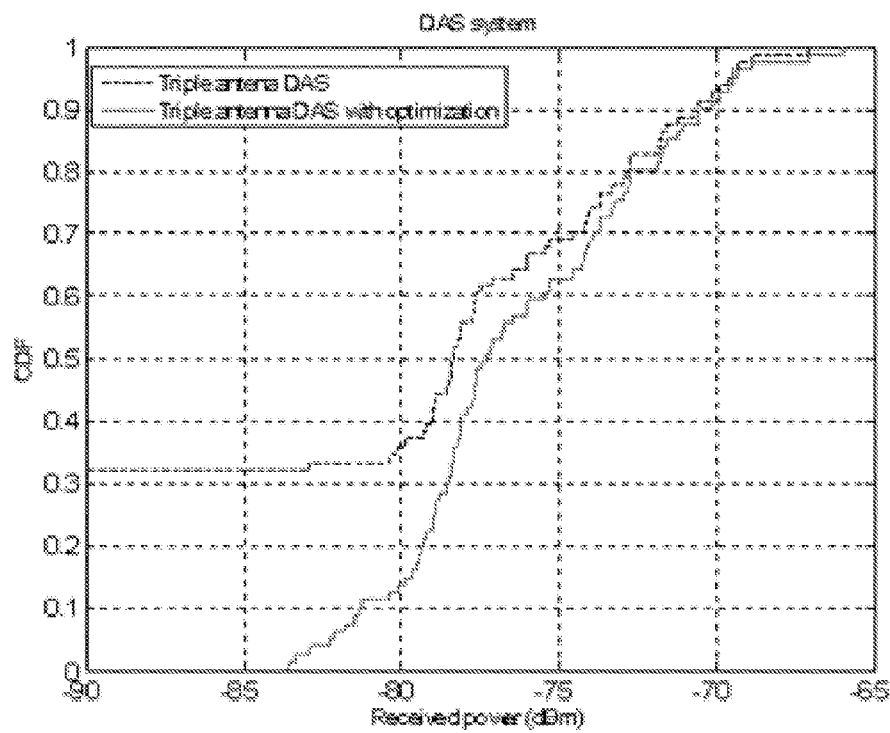

This demonstration is carried out over a 20 m×6 m area as shown in FIG. 17. The antenna diversity combined with frequency dithering technique is shown to increase the probability of a successful read to 100% from 67% as shown in FIG. 18. This result is achieved with +30 dBm EIRP at each antenna.

Coverage Improvement of Multiple Passive RFID Tags

Figure 19:
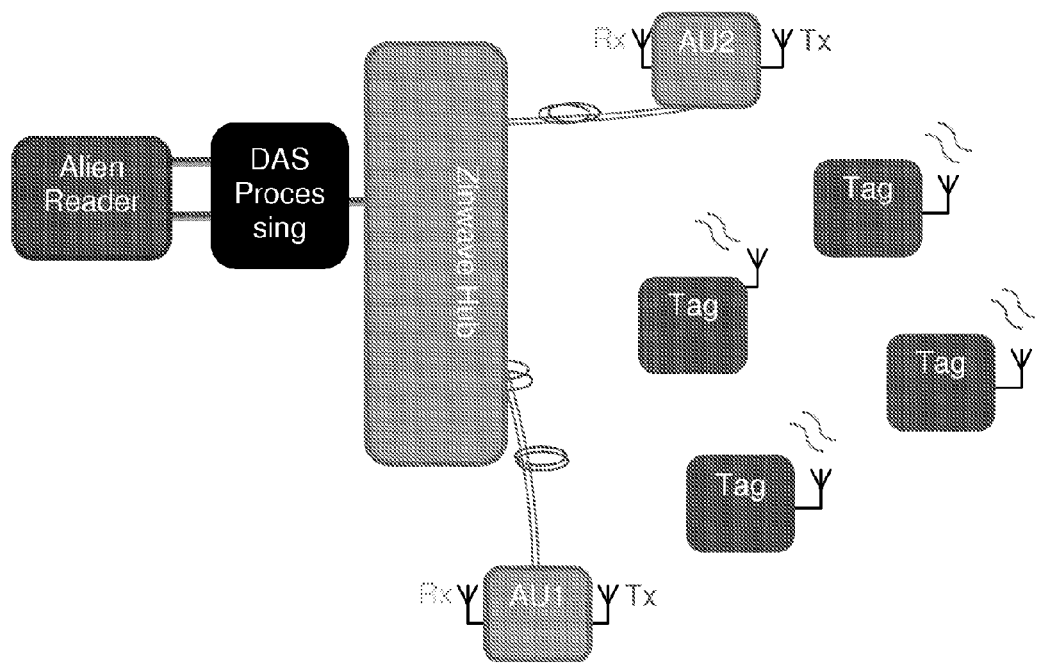
Figure 20:
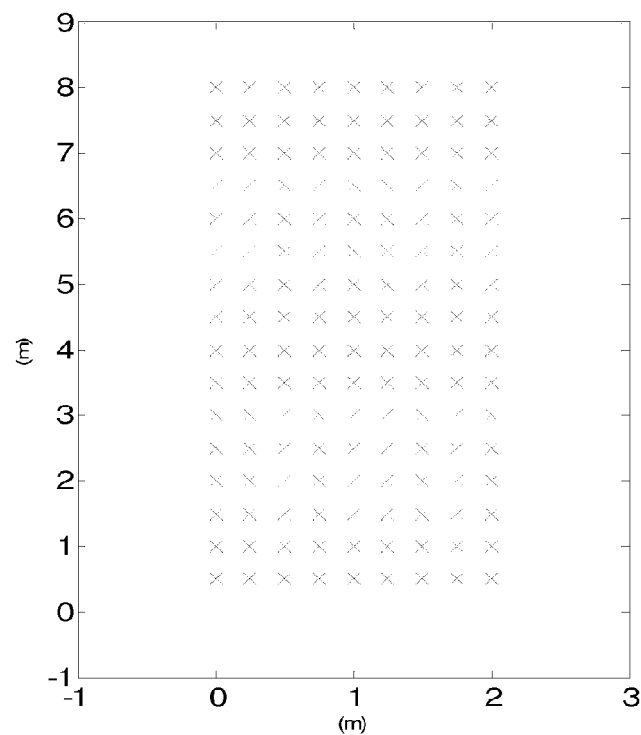
FIG. 20. 140 Alien Higgs2 tags are placed at a height of 2 m in a 25 cm grid interval over a 10 m×4 m area.

Coverage improvement of single tag has been shown in the previous section. Here, it is shown that a similar improvement can be achieved with multiple tags. As shown in FIG. 19, a double antenna combined with Alien 8800 RFID reader is used in this experiment. 140 Alien Higgs2 tags are placed at a height of 2 m in a 25 cm grid interval over a 10 m×4 m area as shown in FIG. 20. A +32 dBm equivalent isotropically radiated power (EIRP) is transmitted from each AU and the combined optimised tag returned signals RSSI is measured. The phase difference between the antenna is randomly dithered quantised in 24° intervals between 0° to 360° while the frequency is varied from 865.7 MHz to 867.5 MHz in 200 kHz steps using a Labview programme.

Figure 21:
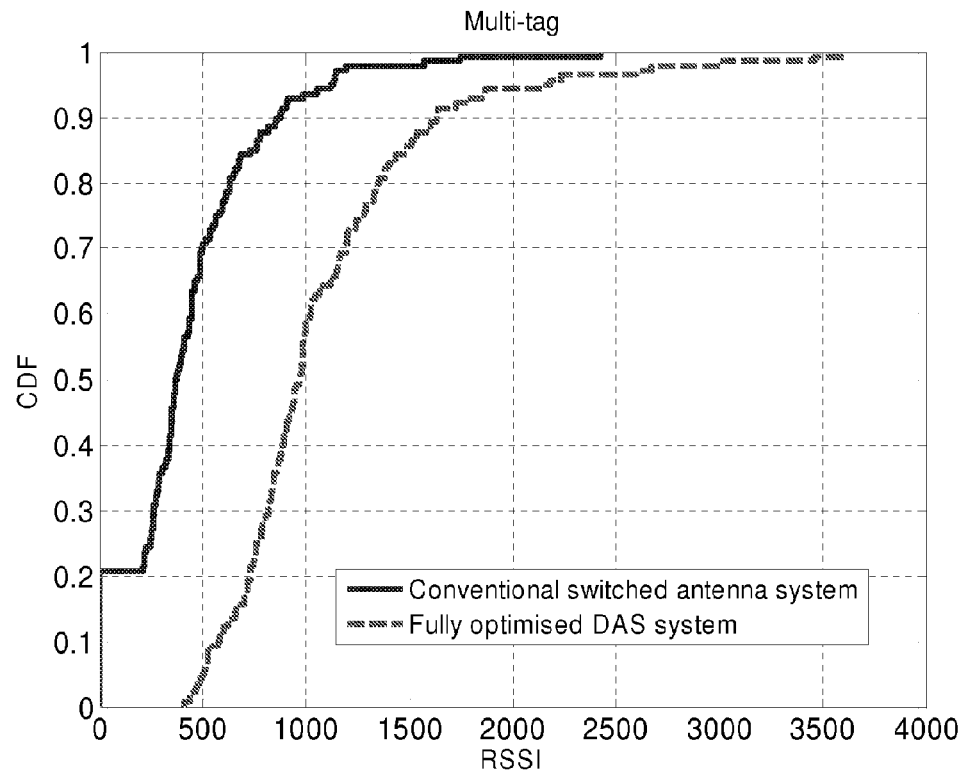
FIG. 21. Cumulative probability distribution of the experimentally measured returned signal power for both conventional switched antenna system and fully optimised DAS system.

The antenna diversity combined with frequency dithering technique is shown to increased the tag read accuracy from 79% (111 tags) to 100% (140 tags) in a fully optimised DAS over a conventional switched multi-antenna system as shown in FIG. 21.

Read Rate/Speed Enhancement of Multiple Passive Tags

Lack of access to the low level reader functions in off the shelf RFID readers prevent integration of the DAS optimisation algorithms and the tag query cycle. Read rate is investigated using a probabilistic model for the number of occupied successful slots (with useful tag reads), empty slots and collisions (which cause backoffs—if there are too many collisions the number of available timeslots is increased, the reader detecting collisions). Data from the earlier measurements of the ability of the optimised DAS to read multiple tags is used in the simulation to determine how many unique, un-inventorised tags exist in the field of view for the optimised DAS in each state and a conventional system. The DAS is compared to a conventional RFID which switches between antennas performing inventory cycles.

The Alien RFID 8800 reader uses two main parameters to tune the reading of multiple tags. The Q-factor determines how many slots ($2^Q$) are allocated in the Aloha algorithm. In an inventory the Q-factor can be varied for each count. The DAS RFID system is configured to perform a tag inventory cycle comprising a plurality of tag read rounds to read tags, a tag read round having a set of time slots, determined by the Q-bit random number in the tag slot counter, during which a tag decrements its slot counter and is able to transmit tag data including a tag ID for reception by antenna when the tag slot counter is 0. During the inventory cycle read tags have the inventorised bit set so that they do not compete in subsequent cycles speeding up the inventory.

Figure 22:
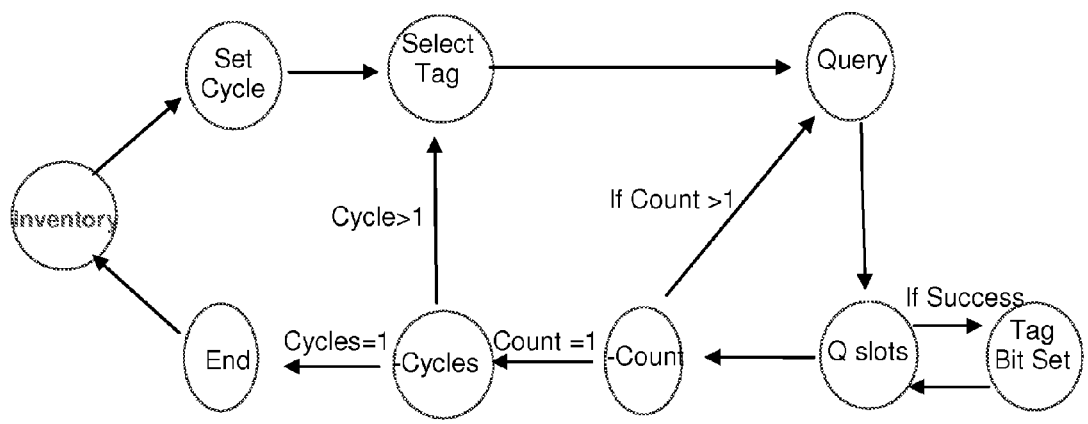
FIG. 22. A schematic of Gen 2 protocol; Inventory is mainly controlled by Count and Q factor. At the start of each cycle, the Tag Select command wakes all tags and count read attempts with Q slots are then made.

At the start of each cycle, the Tag Select command wakes all tags and sets their inventorised bit to zero. Count read attempts are then made. Each read attempt assigns $2^Q$ slots for the tags to compete for. The number (Q) is transmitted to the tags and enables a tag to load a Q bit random number into their slot counter. Tags are then requested to decrement the value of their slot counter and are allowed to transmit if and only if their slot counter is zero. Once they are successfully read, they are instructed to keep silent for a period set by the session flag persistence time (eventually re-awakening). Successfully read tags have the inventorised bit set so they do not compete for slots in future counts until a new cycle is started. The DAS optimisation settings are changed for each count (FIG. 22).

Figure 23:
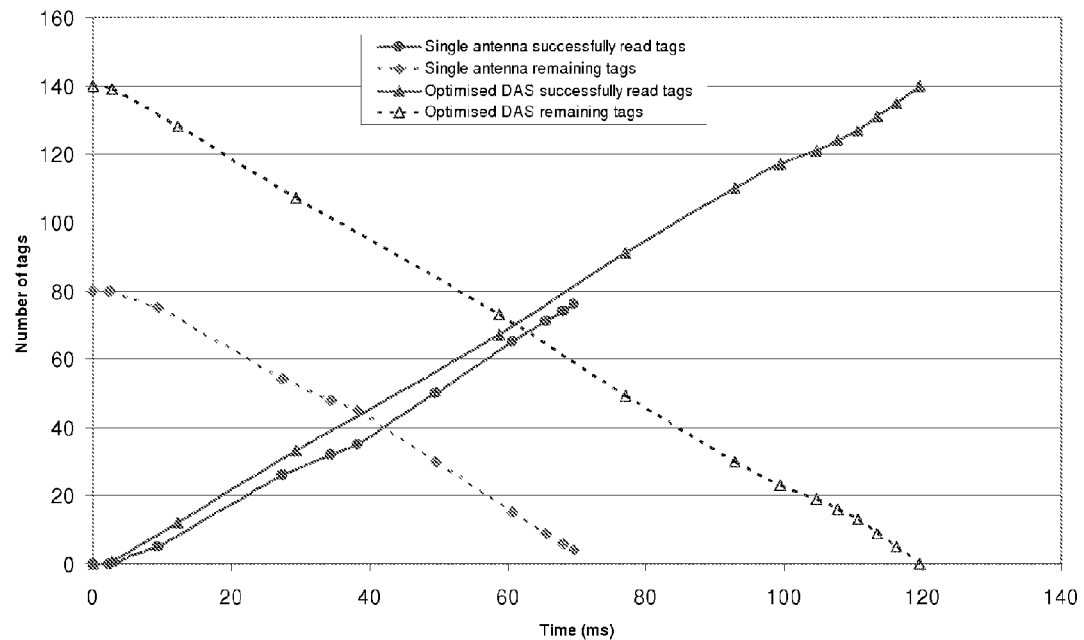
FIG. 23. A plot number of read tags against time for a conventional switched antenna and an optimised DAS RFID system. Conventional switched antenna system—2× 68.6=137.2 ms with accuracy of 79% (111 tags out of 140 tags)=809 tags/sec. Optimised DAS=119.52 ms with accuracy of 100% (140 tags out of 140). Note that DAS takes only 93.42 ms for 111 tags=1,188 tags/sec.
Figure 24:
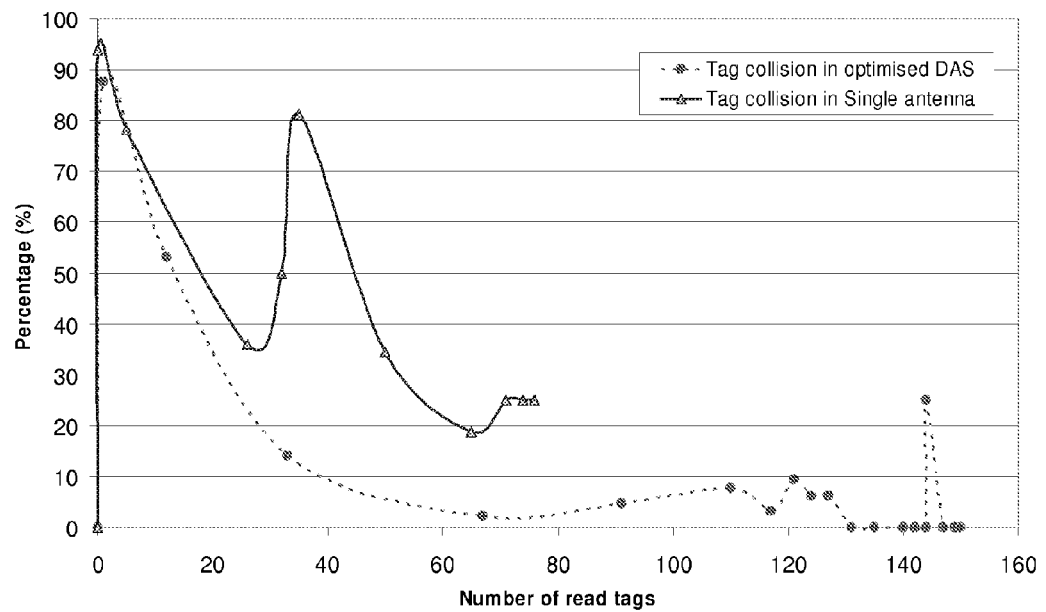
FIG. 24. This shows that the number of collisions is reduced in optimised DAS system over a conventional multi-antenna system FIG. 25. Incorporating the phase dithering in the RF front end using an Intel R1000 reader development kit.

Simulation is performed with 80 tags in view of each antenna in the switched system as well as 140 tags for a DAS system. FIG. 23 shows that a 47% improvement (from 809 tags/sec to 1188 tags/sec) tag read rate can be achieved in optimised DAS system compared to a conventional switched antenna RFID system through modelling. This is achieved by reducing the number of collisions (FIG. 24) within each read as the DAS optimisation technique allows us to move the nulls around the field. Hence, only a certain number of tags are active at any time. (The peaks in FIG. 24 are where the number $2^N$ of available timeslots is decreased). The number of active tags for every DAS setting is obtained from experimental results. It is then used to simulate the optimised DAS in our analytical model. DAS optimisation technique operates on a loop just above the count (such that the Q factor is adjusted for each DAS setting combination). This enables the inventorised bit of the tags to be exploited to prevent the re-reading of tags.

Proof of Principle Demonstration

Figure 25:
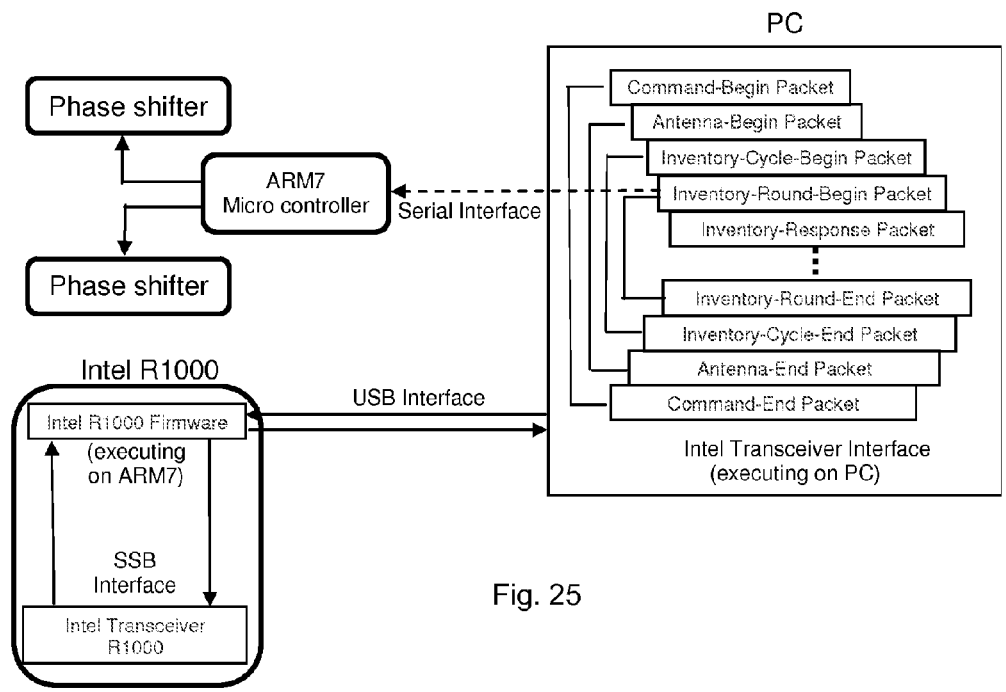
Figure 26:
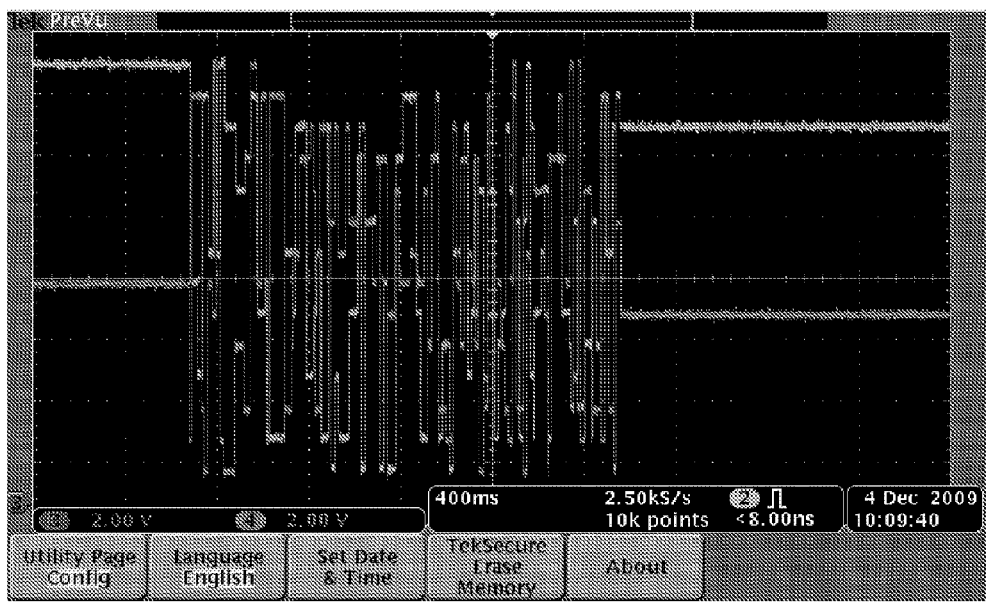
FIG. 26. This shows the random variation in control voltage i.e. random phase dithering. This is done by making use of a random number generator in C/C++.

A proof of principle demonstration for the improved read speed/rate has been carried out. A prototype based on an Intel R1000 development board is developed as shown in FIG. 25. The R1000 supports host side applications (Intel Transceiver interface). The transceiver interface includes a C/C++ functional interface to communicate with the firmware module using USB communication. When an inventory is performed using the transceiver interface, the R1000 returns data from the Intel firmware over the USB interface in a sequential of packets to the host PC. Phase is randomly varied using voltage controlled phase shifters (as shown in FIG. 26) controlled by the PC when the R1000 returns the inventory-round-begin packet which indicates the beginning of an inventory round (as shown in FIG. 25).

Figure 27:
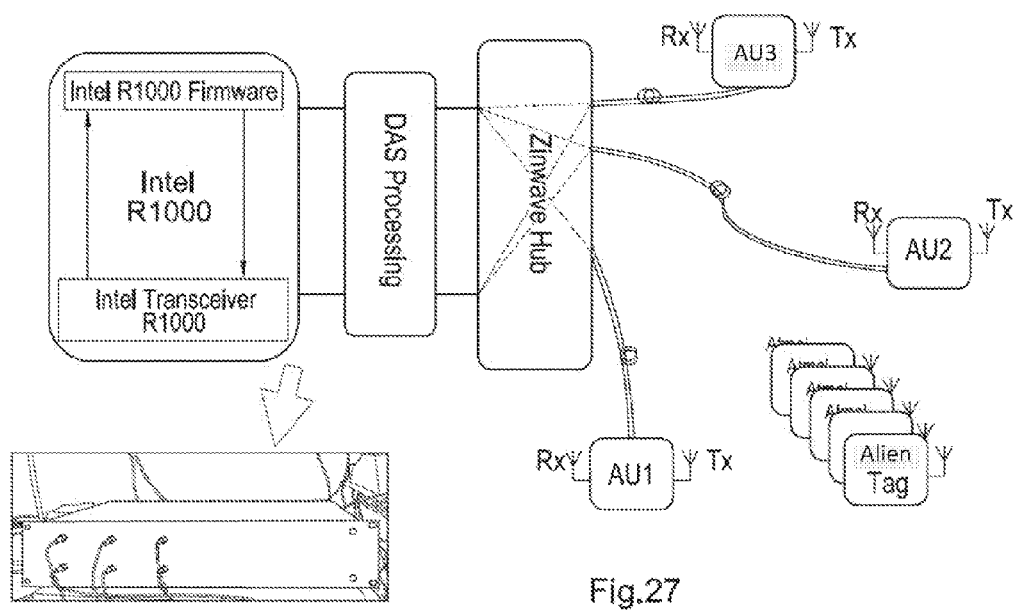
FIG. 27. DAS RFID system based on Intel R1000 has been developed as part of the principle demonstration.
Figure 28:
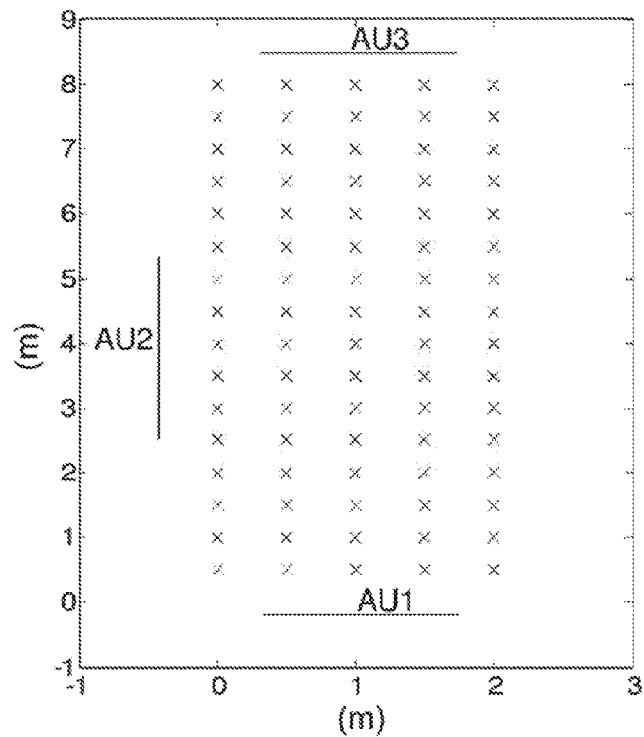
FIG. 28. 80 Alien Higgs2 tags are placed at a height of 2 m in a 50 cm grid interval over a 10 m×4 m area.

The developed triple antenna DAS RFID system is configured to transmit signals in the UK RFID band and a +30 dBm EIRP is transmitted from each antenna as shown in FIG. 27. 80 Alien Higgs2 tags are placed at a height of 2 m in a 50 cm grid interval over a 10 m×4 m area as shown in FIG. 28. We used an R1000 development board to implement fixed and dynamic Q algorithms to read multiple tags. Here, we show a tag read enhancement over both algorithms.

Figure 29A:
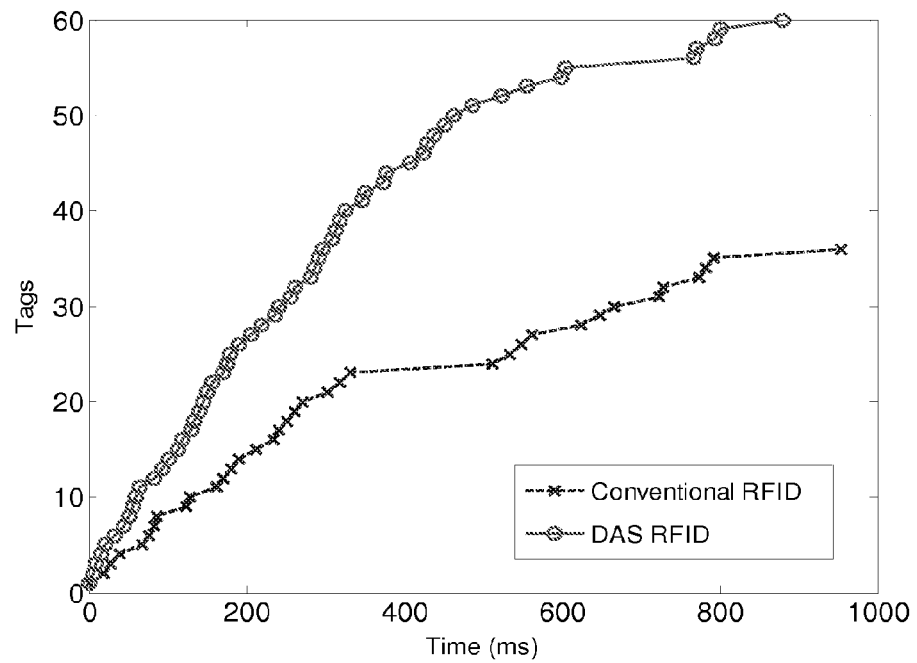
FIGS. 29a to 29h show, respectively, a plot number of read tags against time for a conventional RFID system and an optimised DAS RFID system; a plot number of RN16 timeouts against time for a conventional RFID system and an optimised DAS RFID system; a plot number of RN16 received against time for a conventional RFID system and an optimised DAS RFID system; a plot number of good EPC reads against time for a conventional RFID system and an optimised DAS RFID system; a plot number of read tags against time for a conventional RFID system and an optimised DAS RFID system; a plot number of RN16 timeouts against time for a conventional RFID system and an optimised DAS RFID system; a plot number of RN16 received against time for a conventional RFID system and an optimised DAS RFID system; and a plot number of good EPC reads against time for a conventional RFID system and an optimised DAS RFID system.

Read Rate/Speed Enhancement Using Phase and Frequency Dithering Over R1000 Fixed Q Algorithm An inventory using the fixed Q algorithm is performed with the system operating as a conventional (where a triple antenna system is used to transmit signals simultaneously) and an optimised triple antenna DAS RFID system (where frequency and phase dithering is applied over a triple antenna system). As shown in FIG. 29a, the conventional antenna system reads tags at a rate of 38 tags/sec while the optimised DAS RFID is at a rate of 68 tags/sec. As a result, an 81% improvement in read rate is demonstrated in the DAS RFID system over a conventional system. In addition, an initial read rate of >110 tags/sec is sustained for a greater proportion of the total tag population using the DAS RFID system as shown in FIG. 29a. The improvement in the tag read rate is due to the fact that the number of collisions within each inventory round is reduced and read success rate is enhanced using the DAS optimisation technique as it moves the nulls around the field. Hence, only a certain number of tags are active at any time. The DAS optimisation technique operates on a loop just above the count (such that the Q factor is adjusted for each DAS setting combination). This enables the inventorised bit of the tags to be exploited to prevent the re-reading of tags.

Figure 29B:
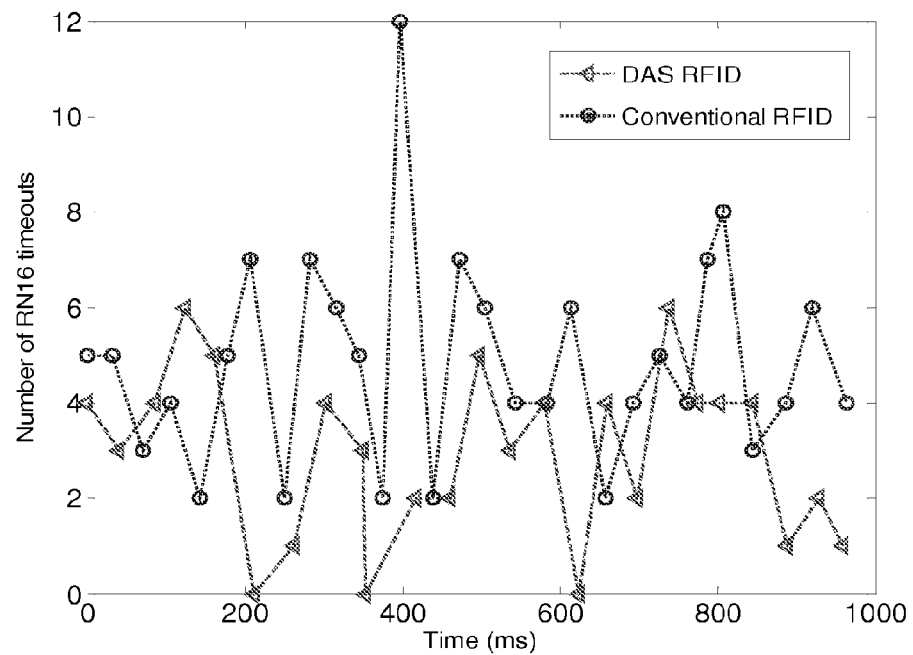
Figure 29C:
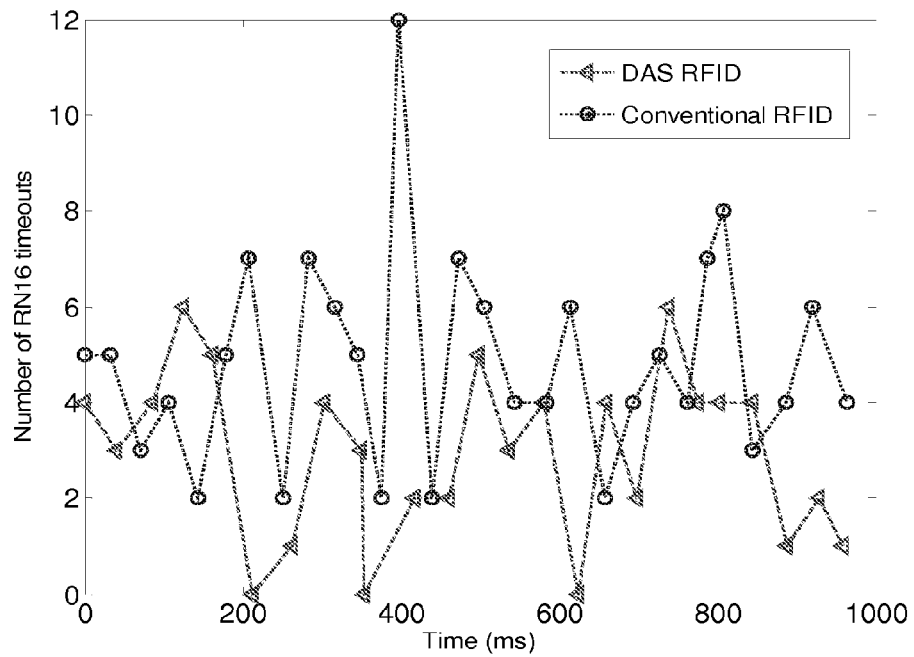
Figure 29D:
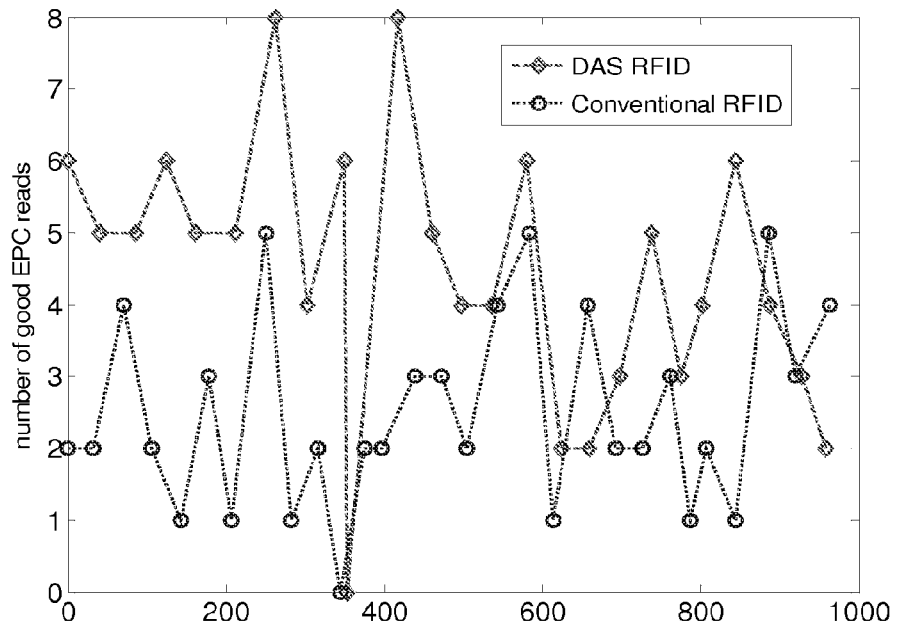

FIG. 29b shows a plot of number of RN16 timeouts against time for the conventional RFID system and the optimised DAS RFID system. The RN16 timeouts occur due to both collided and empty slots. It is clearly shown that DAS RFID encounters fewer collided and empty slots compared with a conventional RFID system. For a complete comparison, the number of RN16 received and good EPC reads (successful tag reads) are shown in FIGS. 29c and 29d respectively for both DAS RFID and conventional systems. The results clearly illustrate that a high sustained tag throughput with large tag populations can be obtained in a DAS RFID that can outperform conventional RFID readers.

Figure 29E:
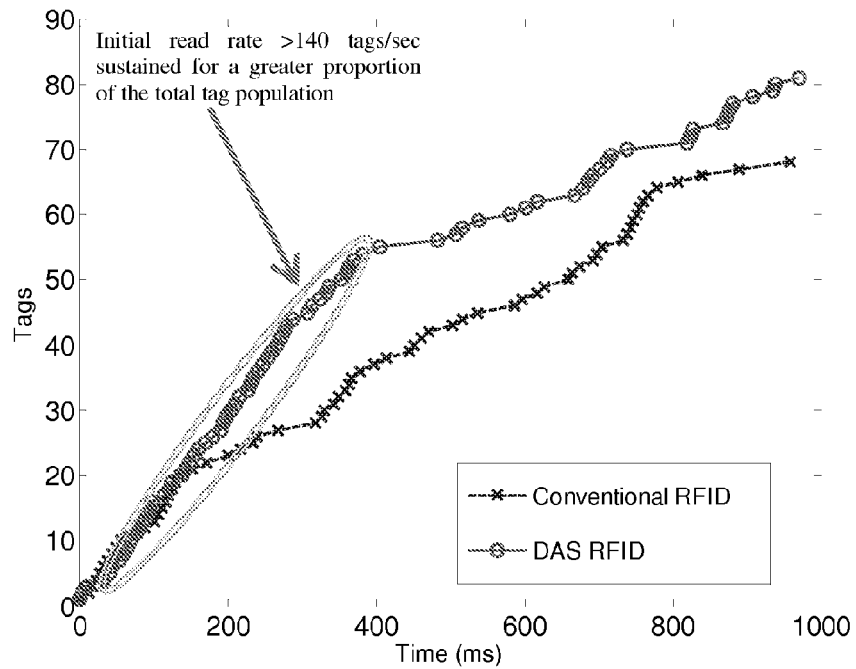

Read Rate/Speed Enhancement Using Phase and Frequency Dithering Over R1000 Dynamic Q Algorithm An inventory using dynamic Q algorithm is also performed for both conventional and optimised RFID systems. As shown in FIG. 29e, the conventional RFID system presents a tag read at a rate of 71 tags/sec and the optimised DAS RFID provides a read rate of 84 tags/sec. Thus, a 19% improvement in tag read speed is achieved. Moreover, an initial read rate of >140 tags/sec is sustained for a greater proportion of the total tag population using the DAS RFID system.

Figure 29F:
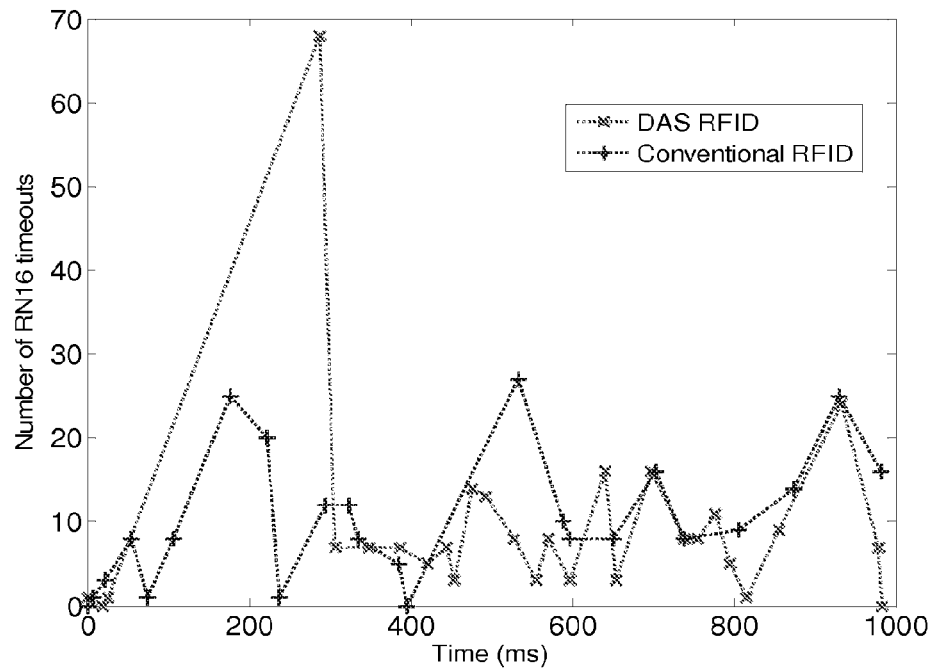
Figure 29G:
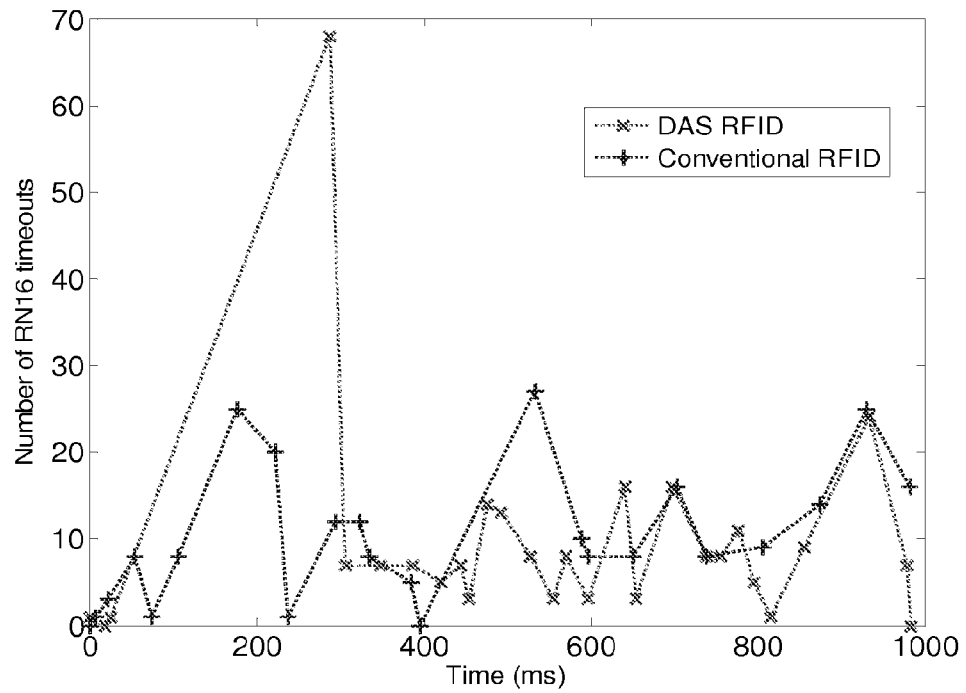
Figure 29H:
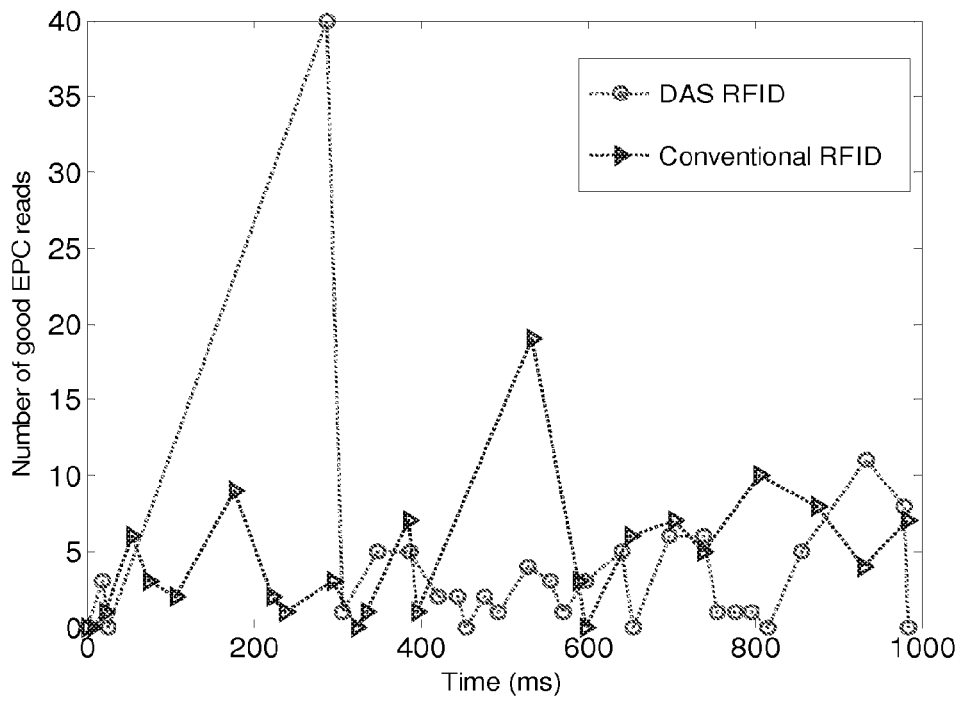

FIG. 29f shows a plot of number of RN16 timeouts against time for the conventional RFID system and the optimised DAS RFID system. It is again shown that DAS RFID encounters fewer collided and empty slots compared with a conventional RFID system. The number of RN16 received and good EPC reads are shown in FIGS. 29g and 29h respectively for both DAS RFID and conventional systems. The results again indicate that a high sustained tag throughput is possible in a DAS RFID system.

The demonstrator shows that while an enhanced tag read rate is achieved in the DAS RFID system, the initial tag read rate is sustained for a greater proportion of the total tag population. This improvement is due to both a reduction in the number of collisions (result of dynamic grouping) and an improvement in the read success rate (result of enhanced radio coverage). It is anticipated that the projected tag read rate of >1000 tags per second is possible with next iteration of reader development with closer integration and also by configuring the tag to reader protocol to achieve the maximum data rate. The closer integration will be achieved by editing the R1000 reader firmware to provide an indication of each read attempt resulting in perfect synchronisation with phase dithering at each read attempt within an inventory round.

Multi-Antenna Distributed Antenna (DAS) System

Figure 30:
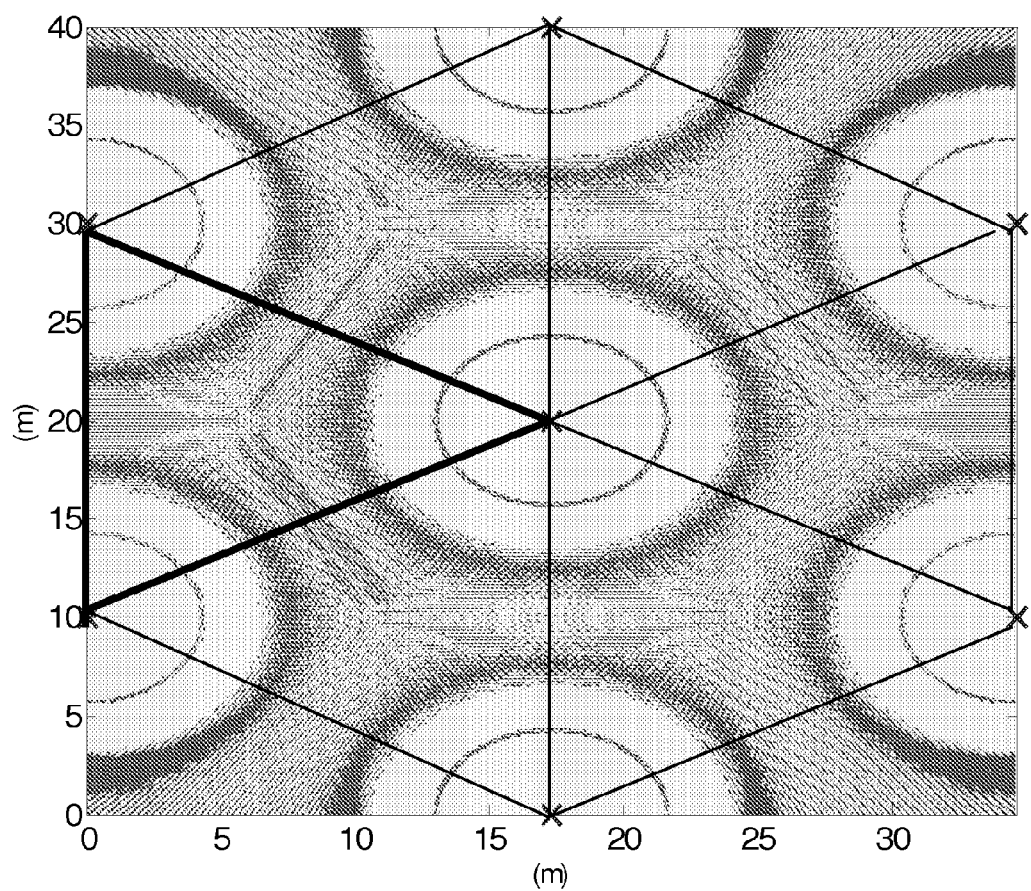
FIG. 30. A hexagonal structure with 20 m antenna spacing. A plot of spatial variation in the signal power using a 2-ray model. Yellow represents above −15 dBm power level and red represents below −15 dBm power level which represents nulls. The positions of the antennas are indicated by blue crosses. The number of read locations is 70%.

We have shown that passive RFID coverage of a triple antenna DAS system can be improved using antenna diversity combined with frequency dithering technique. As a result there is a potential for forming a multi-antenna DAS system which employs six three-antenna DAS to form a hexagonal structure. A hexagonal structure is formed to achieve tessellating cells as shown in FIG. 30. The antennas are shown by the blue crosses. A simple 2-ray model is used to model the RFID fading. As shown in FIG. 30, the received signal power from the antennas each transmitting +30 dBm is calculated on a 5 cm grid interval. It is then used to determine whether a successful read is possible at that location by assuming a tag threshold power of −15 dBm and that the tag threshold power will be the limiting factor. The time averaged effect of fading can be reduced by using the antenna diversity and frequency dithering technique. Hence, it is possible to form a number of hexagonal cells and thus we believe that the read range can be extended similar to a value comparable with a wireless local area network (WLAN) and ubiquitous coverage can then be achieved with common infrastructure.

It is anticipated that a large number of tags need to be read in a multi-antenna DAS system. It is therefore possible to split a hexagonal structure into six cells of 3 antennas and searching, ensuring other cells are on different frequency dithers. This can be managed by using a single antenna to transmit simultaneously two ore more frequencies. Moreover, it is possible to sweep all 6 triangles in a hexagon concurrently if tag density is low. Consequently, channel management will be the key in order to handle high volume tags. Therefore, frequency reuse, time diversity technique can be applied for handling large number of tags in a multi-antenna DAS system.

It should be noted that embodiments of the invention not only provide enhanced coverage for passive UHF RFID, but can also deliver improved performance for any RF powered system.

Antenna and Polarisation Switching in Multi-Antenna Distributed Antenna (DAS) System It is shown that RFID coverage can be enhanced by dithering phase and frequency. However, this approach could be used alongside other techniques such as polarisation switching (i.e. switching the polarisation (vertical or circular) of Tx and Rx antennas at a particular location), or switching which antennas are employed for Tx and Rx, to enhance the coverage further. This is due to the fact that the locations of constructive interference occurring due to phase and frequency dithering vary with antenna polarisation and radiation pattern.

Frequency Dithering Over Multiple Antennas

This relates, for example, to a system which repetitively performs a tag read round and then changes frequency: Frequency dithering, in embodiments randomly selecting a frequency to use out of many, can vary the location of the nulls, moving them away from the tag and facilitating a successful reading. In this way, embodiments have been able to achieve a 100% read success rate (effectively error free operation) and thus provide an improved area of coverage.

Figure 31:
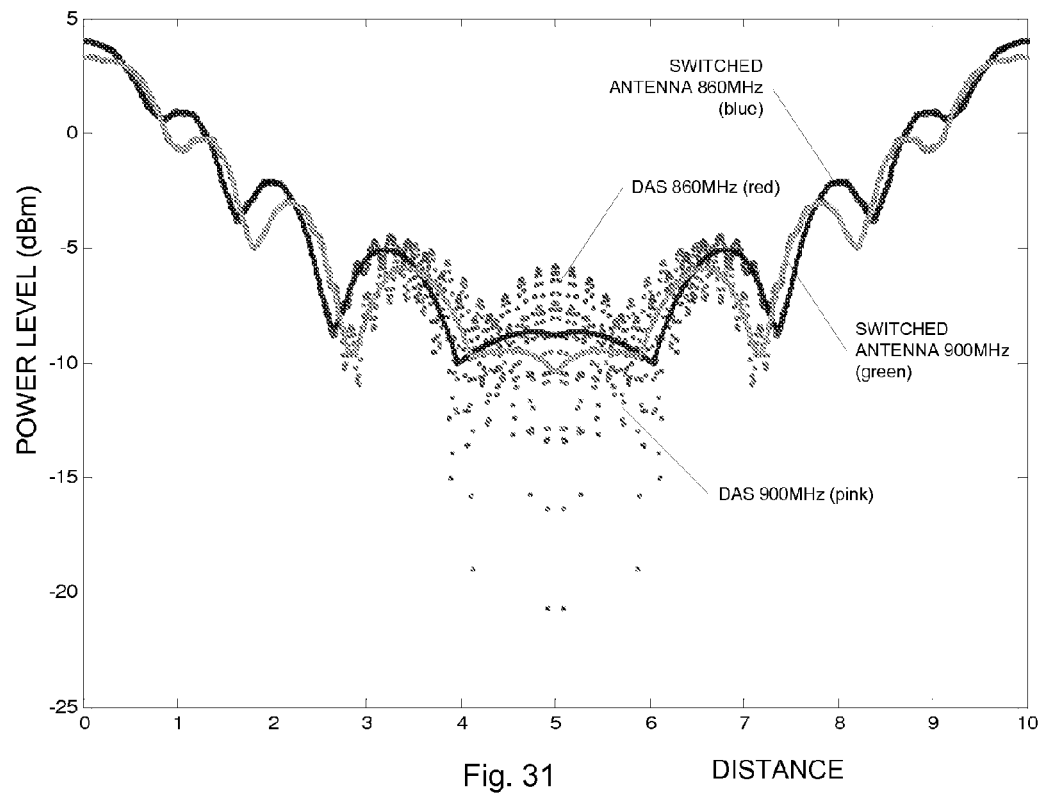
FIG. 31: Shows power level (dBm) against tag location (distance in meters) for switched antenna, and distributed antenna system (DAS), tag communication systems at 860 MHz and 900 MHz, showing that frequency dithering has strong effect with multiple antennas (DAS) compared with a single antenna (switched antenna system).
Figure 32:
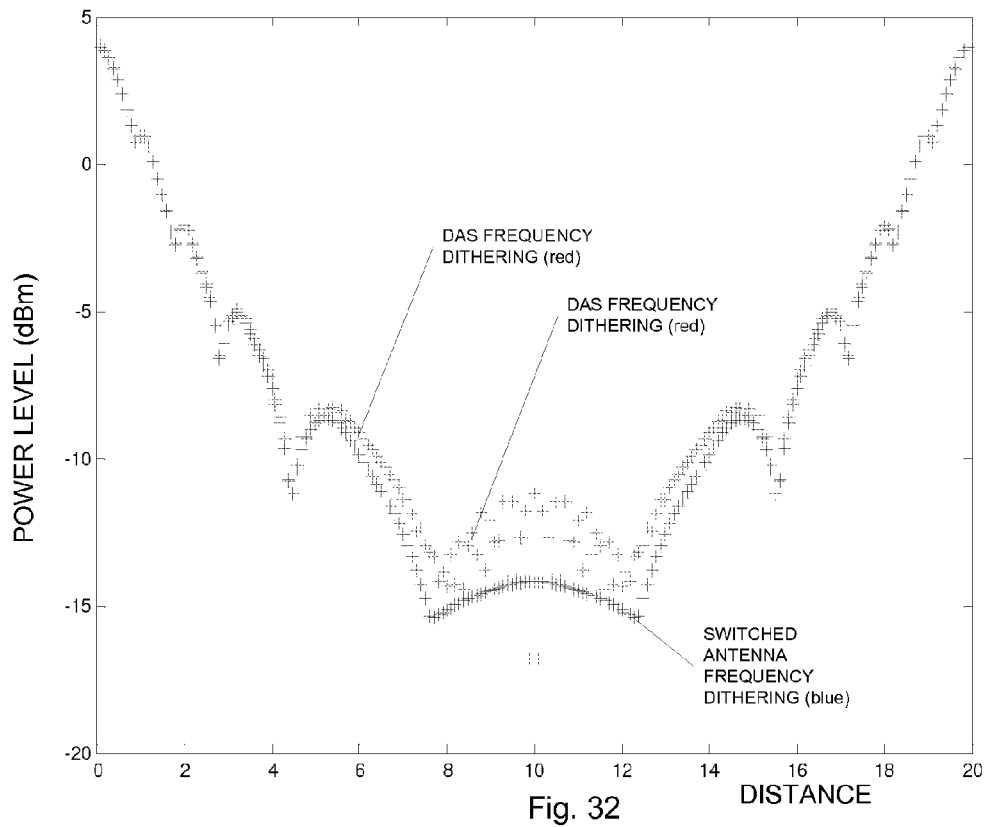
FIG. 32: Shows the effect of frequency dithering between 860 and 950 MHz (where frequency is randomly selected between 860 MHz and 950 MHz), for a double antenna DAS and double switched antenna, showing that frequency dithering has a strong effect with multiple antennas (a DAS) as compared with a single antenna (switched antenna system).

The coverage can be further enhanced if frequency dithering applied over multiple antennas which are configured to transmit the same frequency simultaneously as opposed to the dithering applied over a conventional switched antenna system. For example, FIG. 31 shows a comparison of a two antenna multi-casting (DAS) system and a switched double antenna system where antennas are placed 10 m apart. The received signal strength (RSSI) at the tag as a function of position is shown at 860 MHz and 900 MHz for both systems and it can clearly be seen that at some locations, particularly those roughly equidistance from the two transmitting antennas, the multi-casting system results in a stronger frequency dependent RSSI at the tag location than the switched antenna system. While at some locations the power is increased, some locations result in a decrease in the received power, but this effect can be overcome by the phase shifting (repetitively performing a tag read round and then changing phase). FIG. 32 shows a similar result when the frequency is dithered from 860 MHz to 950 MHz and the maximum RSSI recorded.

These effects arise because varying the frequency over multiple antennas (which transmit simultaneously) results in both constructive and destructive interference signals from multiple antennas, and in areas of constructive interference the signal level is enhanced. Therefore applying frequency dithering (particularly when combined with phase dithering)

over a multi-casting antenna system tends to show a further improvement in radio frequency identification (RFID) coverage compared to a switched antenna system.

Concurrent Frequency Dithering Over Multiple Antennas Using Multiple Tag Transceivers Frequency dithering, in particular randomly selecting a frequency out of many, applied over multiple antennas, which transmit radio frequency (RF) signals simultaneously, can improve RFID coverage. This is due to the fact that varying the frequency over multiple antennas (which transmit simultaneously) results in both constructive and destructive interference signals from multiple antennas, an in areas of constructive interference the signal level is enhanced. Therefore applying frequency dithering (particularly when combined with phase dithering) over a multi-casting antenna system tends to show a further improvement in radio frequency identification (RFID) coverage compared to a switched antenna system.

We now describe how concurrent frequency dithering over multiple antennas as opposed to a sequential frequency dithering can provide increased speed of tag read rate in a DAS RFID system. This is due to the low-error tag reading system we have described above is based on varying frequency and phase over multiple antennas. This uses multiple frequencies to be transmitted to dither the location of nulls. If the frequency of RFID signals are dithered sequentially there is a need for multiple tag inventory rounds/cycles (comprising a set of time slots to read multiple tags). However, if the multiple frequencies are transmitted in parallel (i.e. concurrent frequency dithering), all the tags can then be read in reduced number of inventory rounds/cycles. In order to read RFID tags faster, we parallelise the dithering operations as much as possible in a DAS RFID system as previously described.

This parallelised operation can be implemented with multiple reader/transceiver ICs (leading to multiple RF front ends), which can enable transmission of multiple frequencies simultaneously over each AU, and independent processing of the returned tag signal on each carrier frequency. To improve the tag read rate, multiple frequencies are multi-cast across all the antennas simultaneously such that frequency dithering can occur simultaneously rather than sequentially. An arrangement of this type has a great impact on tag read speed/rate resulting in a high speed sensing system.

This concurrent frequency dithering is possible in RFID system because the RFID tags are not tuned to a particular frequency in the RFID band, hence modulation of the backscatter will have substantially the same effect at multiple frequencies simultaneously. Due to the lack of frequency selectivity care should be taken to ensure that the same reader to tag commands are transmitted across all frequencies and AUs simultaneously otherwise RFID performance can be degraded due to multiple protocol commands.

We have thus described methods and systems for providing enhanced coverage of RF powered systems such as passive UHF RFID by multicasting the signals over two or more antennas and manipulating the phase differences and carrier frequency between the transmitted signals. Preferably the antennas are placed outside each other's near field.

Embodiments substantially eliminate nulls using RFID signal sources to transmit two or more frequencies from each antenna and dithering the carrier frequency between them in steps. Embodiments also substantially eliminate nulls using phase shifts between two or more antennas and dithering the phase between them in steps. Further embodiments substantially eliminating the nulls by manipulating the phase differences and carrier frequency where the phase is varied between two of the antennas in 24° steps between 0° to 360° while the frequency is varied from 860 MHz to 960 MHz in 1 MHz steps. In each case, where more than two antennas are used an exhaustive search may be employed. The methods/systems combine the received signals from two or more antennas and then process them at the base station. Preferably the methods/systems apply a different gain to the signal from each antenna to optimise the combined received signal SNR; this may be by altering the gain of uplink of each antenna unit (AU) in 10 dB steps or less between 0 dB and 30 dB. Embodiments provide enhanced passive UHF RFID and sensor coverage using the phase and power diversity. Embodiments also improve read range of a RFID and sensor system with the phase and power diversity, and/or improve the read speed/rate of a RFID and sensor system with the phase and power diversity, and/or improve the location accuracy of a RFID and sensor system with the combined RSSI from multiple antennas, phase diversity and power diversity.

In some preferred embodiments of the methods the antennas are fed either by co-ax or by radio over fiber techniques.

Broadly speaking we have described techniques in which, in embodiments nulls are dynamically moved around spatially using frequency and phase dithering, with an overall time-averaged effect of ameliorating or substantially eliminating their deleterious effects.

No doubt many other effective alternatives will occur to the skilled person. It will be understood that the invention is not limited to the described embodiments and encompasses modifications apparent to those skilled in the art lying within the spirit and scope of the claims appended hereto.

We claim:

1. An RFID tag reading system for reading one or more RFID tags, the system comprising an RF transmitter and an RF receiver, a plurality of transmit/receive antennas coupled to said RF transmitter and to said RF receiver, to provide spatial transmit/receive signal diversity, and a tag signal decoder coupled to at least said RF receiver, wherein said system is configured to combine received RF signals from said antennas to provide a combined received RF signal, wherein said RF receiver has said combined received RF signal as an input; wherein said antennas are spaced apart from one another sufficiently for one said antenna not to be within the near field of another said antenna, wherein said system is configured to perform a tag inventory cycle comprising a plurality of tag read rounds to read said tags, a said tag read round comprising transmission of RF tag interrogation signals with defined relative phases simultaneously from said plurality of antennas and receiving a signal from one or more of said tags, a said tag read round having a set of time slots during which a said tag is able to transmit tag data including a tag ID for reception by said antenna, and wherein said system is configured to deliberately generate constructive interference between said simultaneously transmitted RF tag interrogation signals with defined relative phases from said plurality of antennas and to perform, during a said tag inventory cycle, one or both of: a change in a frequency of said tag interrogation signal transmitted simultaneously from said plurality of antennas, and a change in a relative phase of a said RF tag interrogation signal transmitted from one of said antennas with respect to another of said antennas, wherein changing one or both of said frequency and said relative phase dithers a location of said deliberately generated constructive interference.

2. An RFID tag reading system as claimed in claim 1, wherein the system is configured repetitively to perform a said tag read round and then to change said relative phase.

3. An RFID tag reading system as claimed in claim 1, wherein the system is configured repetitively to perform a said tag read round and then to change said frequency.

4. An RFID tag reading system as claimed in claim 2, further configured to transmit an available number said time slots to said tags before a said repetition.

5. An RFID tag reading system as claimed in claim 1, configured to change said relative phase during said tag inventory cycle.

6. An RFID tag reading system as claimed in claim 1, further configured to adjust one or both of a power of said transmitted RF tag interrogation signal from one or more of said antennas during said tag inventory cycle and a receive antenna gain prior to combining said received RF signals to optimise said combined received RF signal.

7. An RFID tag reading system as claimed in claim 1, having at least three said antennas.

8. An RFID tag reading system as claimed in claim 1, wherein said RFID tags comprise a plurality of passive UHF RFID tags and wherein said antennas are mutually separated by at least 1 m, 2 m 5 m 10 m or 20 m.

9. An RFID tag reading system as claimed in claim 1, further comprising RF-over-fibre apparatus to transport said RF signals to and/or from said antennas.

10. An RFID tag reading system as claimed in claim 1, wherein said RFID tag reading system is a leaky feeder system, wherein said RF transmitter and RF receiver comprise, respectively, an RF leaky feeder transmitter and an RF leaky feeder receiver, and wherein one or more of said transmit/receive antennas comprises a leaky feeder.

11. An RFID tag reading system as claimed in claim 1, wherein said system is configured to perform, during a said tag inventory cycle, a change in a polarisation of said tag interrogation signal.

12. An RFID tag reading system as claimed in claim 1, configured to transmit said tag interrogation signal simultaneously on a plurality of different frequencies.

13. A method of using an RFID tag reading system for reading one or more RFID tags, the system comprising an RF transmitter and an RF receiver, a plurality of transmit/receive antennas coupled to said RF transmitter and to said RF receiver, to provide spatial transmit/receive signal diversity, and a tag signal decoder coupled to at least said RF receiver, wherein said system is configured to combine received RF signals from said antennas to provide a combined received RF signal, wherein said RF receiver has said combined received RF signal as an input; wherein said antennas are spaced apart from one another sufficiently for one said antenna not to be within the near field of another said antenna, wherein said system is configured to perform a tag inventory cycle comprising a plurality of tag read rounds to read said tags, a said tag read round comprising transmission of RF tag interrogation signals with defined relative phases simultaneously from said plurality of antennas and receiving a signal from one or more of said tags, a said tag read round having a set of time slots during which a said tag is able to transmit tag data including a tag ID for reception by said antenna, the method comprising:
    deliberately generating constructive interference between said simultaneously transmitted RF tag interrogation signals with defined relative phases from said plurality of antennas and
    changing, during a said tag inventory cycle, one or both of: a relative phase of a said RF tag interrogation signal transmitted from one of said antennas with respect to another of said antennas, and a frequency of said tag interrogation signal transmitted simultaneously from said plurality of antennas,
    wherein changing one or both of said frequency and said relative phase dithers a location of said deliberately generated constructive interference.

14. A method as claimed in claim 13, using leaky feeders, wherein said RFID tag reading system is a leaky feeder system, wherein said RF transmitter and RF receiver comprise, respectively, an RF leaky feeder transmitter and an RF leaky feeder receiver, and wherein said transmit/receive antennas comprise leaky feeders coupled to said RF leaky feeder transmitter and to said RF leaky feeder receiver.

15. A method as claimed in claim 13, further comprising changing, during a said tag inventory cycle, a changing a polarisation of said RF tag interrogation signal.

16. A method as claimed in claim 13, comprising transmitting said tag interrogation signal simultaneously on a plurality of different frequencies.

17. A tag interrogation transceiver for use in the system of claim 12, the tag interrogation transceiver comprising a plurality of transceiver circuits for simultaneous operation, each configured to transmit at a different frequency, wherein each of said transceiver circuits is coupled to a common antenna interface.

18. A tag interrogation transceiver as claimed in claim 17, further comprising a transceiver controller to apply one or both of frequency control and phase control to each of said transceiver circuits.

19. A carrier carrying processor control code to, when running, implement the method of claim 13.

* * * * *